US010050806B2

(12) United States Patent
Chen

(10) Patent No.: US 10,050,806 B2
(45) Date of Patent: Aug. 14, 2018

(54) END-TO-END (E2E) TUNNEL BASED ON SHORTEST POINT-TO-POINT (P2P) PATH COMPUTATION

(71) Applicant: Futurewei Technologies, Inc., Plano, TX (US)

(72) Inventor: Huaimo Chen, Bolton, MA (US)

(73) Assignee: Futurewei Technologies, Inc., Plano, TX (US)

( * ) Notice: Subject to any disclaimer, the term of this patent is extended or adjusted under 35 U.S.C. 154(b) by 52 days.

(21) Appl. No.: 15/370,920

(22) Filed: Dec. 6, 2016

(65) Prior Publication Data
US 2017/0163443 A1    Jun. 8, 2017

Related U.S. Application Data

(60) Provisional application No. 62/263,925, filed on Dec. 7, 2015.

(51) Int. Cl.
*H04L 12/46*    (2006.01)
*H04L 12/721*    (2013.01)
(Continued)

(52) U.S. Cl.
CPC ........ *H04L 12/4633* (2013.01); *H04L 45/124* (2013.01); *H04L 45/04* (2013.01); *H04L 45/48* (2013.01)

(58) Field of Classification Search
CPC ......... H04L 45/12; H04L 45/04; H04L 45/48; H04L 45/124; H04L 12/4633; H04L 12/273; H04L 12/759
See application file for complete search history.

(56) References Cited

U.S. PATENT DOCUMENTS 6,098,107 A  *  8/2000  Narvaez-Guarnieri . H04L 45/48
                                                    709/239
7,859,993 B1 *  12/2010  Choudhury ......... H04L 41/0681
                                                    370/217
(Continued)

OTHER PUBLICATIONS

Chen, et al., "PCE Hierarchical SDNs," draft-chen-pce-h-sdns-00, Mar. 18, 2016, 66 pages.
(Continued)

*Primary Examiner* — Afsar M Qureshi
(74) *Attorney, Agent, or Firm* — Conley Rose, P.C.

(57) ABSTRACT

A method implemented in a parent controller including receiving a request to compute a shortest end-to-end (E2E) path from source to destination through network domains managed by child controllers, receiving path segments and costs computed by the child controllers, wherein the path segments identify in-edge nodes, out-edge nodes, and inter-domain links, generating a candidate list using the path segments and costs received from the child controllers, constructing a shortest path tree (SPT) from the source to the destination through the network domains by repeatedly removing one of the out-edge nodes corresponding to the path segment in the candidate list having a lowest cost and adding the one of the out-edge nodes to the SPT until the destination is reached, determining the shortest E2E path based on the SPT, and transmitting tunnel creation messages to the child controllers to create a tunnel along the shortest E2E path.

20 Claims, 21 Drawing Sheets

(51) Int. Cl.
*H04L 12/715* (2013.01)
*H04L 12/753* (2013.01)

(56) References Cited

U.S. PATENT DOCUMENTS

| | | | | |
|---|---|---|---|---|
| 7,920,466 | B2* | 4/2011 | Vasseur | H04L 45/00 370/229 |
| 9,843,502 | B2* | 12/2017 | Ubaldi | H04L 45/22 |
| 2006/0039391 | A1* | 2/2006 | Vasseur | H04L 45/04 370/409 |
| 2007/0217419 | A1* | 9/2007 | Vasseur | H04L 12/66 370/392 |
| 2008/0219272 | A1* | 9/2008 | Novello | H04L 45/04 370/401 |
| 2015/0103844 | A1* | 4/2015 | Zhao | H04L 45/42 370/410 |
| 2015/0163125 | A1* | 6/2015 | Caviglia | H04L 45/44 370/254 |
| 2017/0033939 | A1* | 2/2017 | Bragg | H04L 12/18 |

OTHER PUBLICATIONS

Chen, et al., "PCE Hierarchical SDNs," draft-chen-pce-h-sdns-01, Oct. 31, 2016, 66 pages.
Hares, et al., "Administrative Domains and Routing Domains A Model for Routing in the Internet," RFC 1136, Dec. 1989, 11 pages.
Bradner, "Key Words for Use in RFCs to Indicted Requirement Levels," RFC 2119, Mar. 1997, 3 pages.
Katz, et al., "Traffic Engineering (TE) Extensions to OSPF Version 2," RFC 3630, Sep. 2003, 14 pages.
Le Roux, Ed. et al., "Requirements for Inter-Area MPLS Traffic Engineering," RFC 4105, Jun. 2005, 21 pages.
Zhang Ed., et al., "MPLS Inter-Autonomous System (AS) Traffic Engineering (TE) Requirements," RFC 4216, Nov. 2005, 28 pages.
Farrel, et al., "A Path Computation Element (PCE)—Based Architecture," RFC 4655, Aug. 2006, 38 pages.
Li, et al., "IS-IS Extensions for Traffic Engineering," RFC 5305, Oct. 2008, 18 pages.
Chen, et al., "ISIS Extensions in Support of Inter-Autonomous System (AS) MPLS and GMPLS Traffic Engineering," RFC 5316, Dec. 2008, 19 pages.
Chen, et al., "OSPF Extensions in Support of Inter-Autonomous System (AS) MPLS and GMPLS Traffic Engineering," RFC 5392, Jan. 2009, 17 pages.
Vasseur, Ed., et al., "Path Computation Element (PCE) Communication Protocol (PCEP)," RFC 5440, Mar. 2009, 88 pages.
Vasseur, Ed., et al., "A Backward-Recursive PCE-Based Computation (BRPC) Procedure to Compute Shortest Constrained Inter-Domain Traffic Engineering Label Switched Paths," RFC 5441, Apr. 2009, 19 pages.
Zhao, Ed., et al., "Extensions to the Path Computation Element Communication Protocol (PCEP) for Point-to-Multipoint Traffic Engineering Label Switched Paths," RFC 6006, Sep. 2010, 33 pages.
King, Ed., et al., "The Application of the Path Computation Element Architecture to the Determination of a Sequence of Domains in MPLS and GMPLS," RFC 6805, Nov. 2012, 33 pages.

\* cited by examiner

END-TO-END (E2E) TUNNEL BASED ON SHORTEST POINT-TO-POINT (P2P) PATH COMPUTATION

CROSS-REFERENCE TO RELATED APPLICATIONS

This application claims priority to U.S. provisional patent application No. 62/263,925 filed Dec. 7, 2015 by Huaimo Chen and titled "System and Method for Creating End-to-End Tunnel," which is incorporated by reference.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Telecommunications networks connect hosts to allow data communication between various geographically distant locations. Path computation for creating an E2E tunnel between hosts may be performed by a parent controller. The parent controller manages a number of child controllers through a hierarchical configuration. The child controllers implement the path computations received from the parent controller using network nodes within the domain or domains that the child controllers manage. However, path computation in large, multi-domain, multi-region, and/or multi-layer networks is complex and computationally intensive. As data usage is increasing with the proliferation of smart devices, tablet computers, network servers, and other smart devices, the demand for data to be forwarded across wireless networks, optical networks, electrical networks, and electro-optical networks is also increasing. Data providers are therefore seeking the most optimal and efficient implementation of path computation for an E2E tunnel.

SUMMARY

In an embodiment, the disclosure includes a parent controller including a receiver configured to receive a request to compute a shortest end-to-end (E2E) path from a source to a destination through one or more network domains managed by one or more child controllers, and receive path segments and path segment costs computed by the child controllers in response to a request for the path segments and the path segment costs sent by the parent controller to the child controllers, wherein the path segments identify at least one of in-edge nodes, out-edge nodes, and inter-domain links corresponding to the network domains; a processor coupled to the receiver and configured to generate a candidate list using the path segments and the path segment costs received from the child controllers, construct a shortest path tree (SPT) from the source to the destination through the network domains by repeatedly removing one of the out-edge nodes corresponding to the path segment in the candidate list having a lowest cost and adding the one of the out-edge nodes to the SPT until the destination is reached, and determine the shortest E2E path based on the SPT; and a transmitter coupled to the processor and configured to transmit tunnel creation messages to the child controllers to create a tunnel along the shortest E2E path.

In an embodiment, the processor is further configured to allocate a global tunnel identifier (ID) and a path ID for each domain for creating the tunnel along the shortest E2E path. In an embodiment, the tunnel creation messages further comprise the global tunnel ID and the path ID. In an embodiment, the path segments comprise links corresponding to the path segments. In an embodiment, the tunnel creation messages further comprise an outgoing label and a link used to create tunnel segments between the source and the destination. In an embodiment, the processor determines whether each node in one of the network domains is a destination node, a source node, one of the in-edge nodes, one of the out-edge nodes, or in a destination domain. In an embodiment, the transmitter is configured to transmit an except list to the child controllers, wherein the except list identifies nodes to which no path segments are computed. In an embodiment, the SPT is grown until the SPT includes the source and the destination.

In another embodiment, the disclosure includes a network device configured to establish an end-to-end (E2E) tunnel corresponding to an E2E path. The network device includes a transmitter configured to send a first message to a destination child controller managing a destination domain, wherein the first message includes a request to create a first segment of the E2E tunnel in the destination domain, and wherein the first message includes a first path identifier corresponding to a segment of the E2E path in the destination domain, identifies an initial node in the destination domain, and identifies a destination node in the destination domain; and a receiver operably coupled to the transmitter and configured to receive a reply message from the destination child controller in response to the first message, wherein the reply message identifies a creation status of the first segment and includes a first incoming label, wherein the first incoming label was assigned by the destination child controller to a link between the initial node in the destination domain and a next hop node in the destination domain.

In an embodiment, the reply message is received after the destination child controller has at least one of reserved resources for the first segment within the destination domain, allocated a label to each link within the first segment, and written cross connects on each node within the first segment. In an embodiment, the transmitter is configured to send a second message to an upstream child controller managing an upstream domain, wherein the second message includes a request to create a second segment of the E2E tunnel in the upstream domain. In an embodiment, the second message includes a second path identifier corresponding to a segment of the E2E path in the upstream domain, identifies an initial node in the upstream domain, and identifies a final node in the upstream domain. In an embodiment, the final node in the upstream domain and the initial node in the destination domain are a same node. In an embodiment, the receiver is configured to receive a reply message from the upstream child controller in response to the second message, wherein the reply message identifies a creation status of the second segment and includes a second incoming label, wherein the second incoming label was assigned by the upstream child controller to an inter-domain link between an out-edge node in a domain further upstream of the upstream domain and the initial node in the upstream domain. In an embodiment, the reply message is received after the upstream child controller has at least one of reserved resources for the second segment within the upstream domain, allocated a label to each link within the second segment, and written cross connects on each node within the second segment. In an embodiment, the transmitter is configured to send a third message to a source child controller managing a source domain, wherein the second message includes a request to create a third segment of the E2E tunnel in the source domain, wherein the third message includes a third path identifier corresponding to a segment of the E2E path in the source domain, identifies a source node in the source domain, and identifies a final node in the source domain. In an embodiment, the receiver is configured to receive a reply message from the source child controller in response to the third message, wherein the reply message indicates that the E2E tunnel was successfully established.

In a further embodiment, the disclosure includes a method implemented in a parent controller including receiving a request to compute a shortest end-to-end (E2E) path from a source to a destination through one or more network domains managed by one or more child controllers, receiving path segments and path segment costs computed by the child controllers in response to a request for the path segments and the path segment costs sent by the parent controller to the child controllers, wherein the path segments identify at least one of in-edge nodes, out-edge nodes, and inter-domain links corresponding to the network domains; generating a candidate list using the path segments and the path segment costs received from the child controllers, constructing a shortest path tree (SPT) from the source to the destination through the network domains by repeatedly removing one of the out-edge nodes corresponding to the path segment in the candidate list having a lowest cost and adding the one of the out-edge nodes to the SPT until the destination is reached, determining the shortest E2E path based on the SPT; and transmitting tunnel creation messages to the child controllers to create a tunnel along the shortest E2E path.

In an embodiment, the method further includes allocating a global tunnel identifier (ID) and a path ID for each domain for creating the tunnel along the shortest E2E path. In an embodiment, the method further includes transmitting an except list to the child controllers, wherein the except list identifies nodes to which no path segments are computed.

A method implemented in a parent controller including means for receiving a request to compute a shortest end-to-end (E2E) path from a source to a destination through one or more network domains managed by one or more child controllers; means for receiving path segments and path segment costs computed by the child controllers in response to a request for the path segments and the path segment costs sent by the parent controller to the child controllers, wherein the path segments identify at least one of in-edge nodes, out-edge nodes, and inter-domain links corresponding to the network domains; means for generating a candidate list using the path segments and the path segment costs received from the child controllers; means for constructing a shortest path tree (SPT) from the source to the destination through the network domains by repeatedly removing one of the out-edge nodes corresponding to the path segment in the candidate list having a lowest cost and adding the one of the out-edge nodes to the SPT until the destination is reached; means for determining the shortest E2E path based on the SPT; and means for transmitting tunnel creation messages to the child controllers to create a tunnel along the shortest E2E path.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
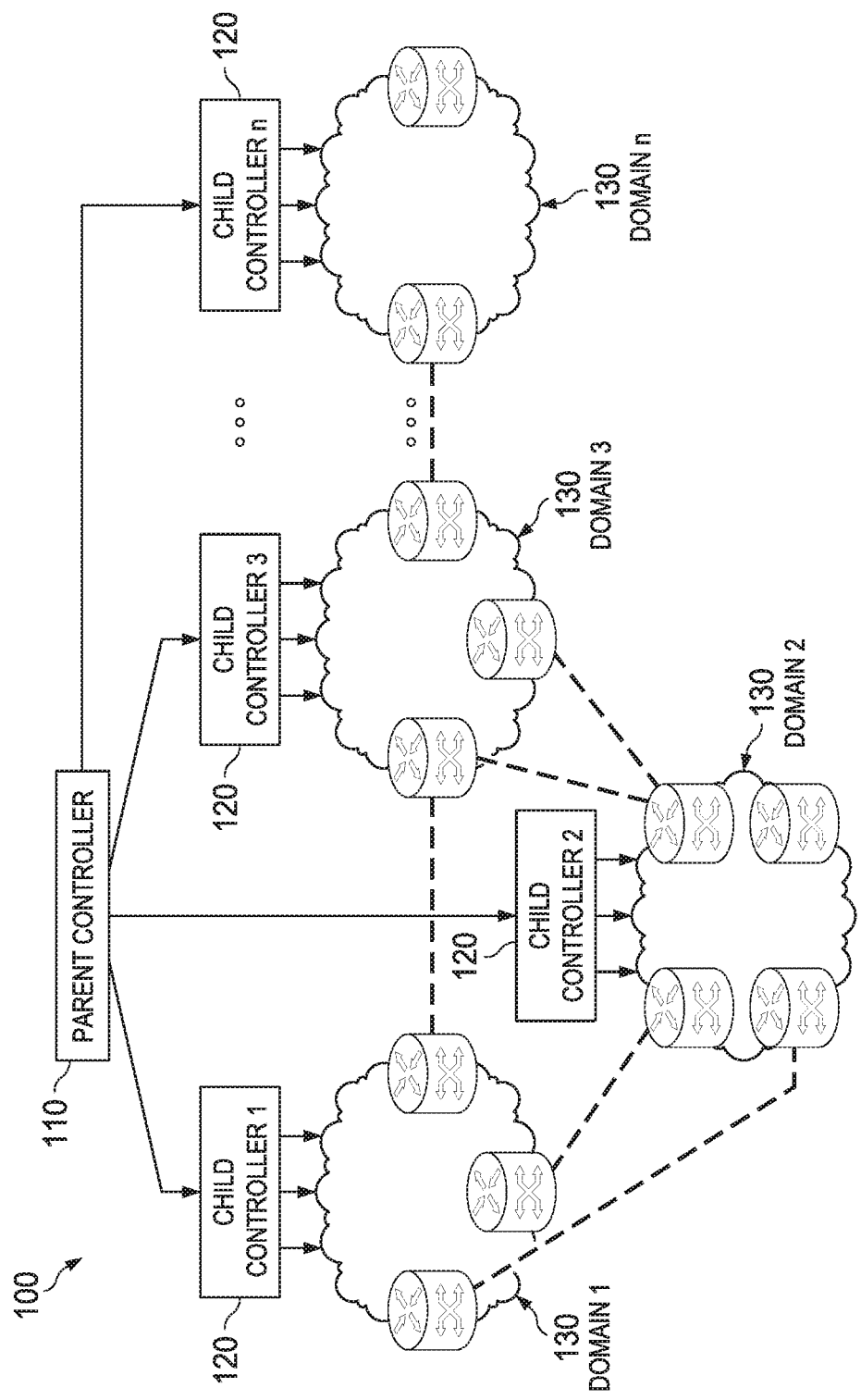
FIG. 1 is a schematic diagram of a path computation system according to an embodiment of the disclosure.

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Telecommunication network providers may perform network management through a variety of approaches. One approach establishes E2E tunnels in hierarchical environments to provide reliable and secure data communication. However, this approach include drawbacks, such as complex system communication among its components (e.g., inaccuracies in network related information or summary), higher computation capability requirement (e.g., parsing of inaccurate summary or topology information), and dependence on resource reservation protocol—traffic engineering (RSVP-TE) due to high traffic overhead. Therefore, the telecommunication industry seeks to optimize data communication by improving approaches for establishing E2E tunnels.

Disclosed herein are various embodiments for determining a shortest E2E P2P path used in creating an E2E tunnel from a source to a destination that satisfies a set of constraints given for the tunnel. By way of example, a parent controller receives a request to compute a E2E P2P path and establish an E2E tunnel along that path. The parent controller manages a number of child controllers, each of which manages one or more domains. The parent controller requests child controllers to compute path segments (e.g., between nodes in its domain, or from the edge node of one domain to the edge node of an adjacent domain). The parent controller builds a shortest path tree (SPT) from a candidate list of the path segments to generate the E2E P2P path. Once the E2E P2P path is determined, the parent controller establishes the E2E tunnel along the E2E P2P path. In other words, centralized and distributed computations are combined to find a shortest E2E P2P path and create the E2E tunnel along the shortest E2E P2P path. The shortest E2E P2P path for an E2E tunnel approach is described in Huaimo Chen, et al, "PCE Hierarchical SDNs," Mar. 18, 2016, which is incorporated by reference. By using the presently disclosed solution, the efficiency of network resource usage is increased and a large network with multiple domains is more effectively controlled. Furthermore, the present disclosure provides a solution for obtaining the shortest E2E P2P path crossing domains and creating the E2E tunnel along the shortest E2E P2P path for optimal data communication. Using the disclosed system, no summary of domains is sent from the child controller to the parent controller. Moreover, the parent controller computes the E2E P2P path with assistance from the child controllers using accurate topology and, therefore, the computed path is optimal. In addition, the tunnel is created without using RSVP-TE.

FIG. 1 is a schematic diagram of a path computation system 100 according to an embodiment of the disclosure. The system 100 comprises a parent controller 110, a number of child controllers 120, and a number of domains 130.

The parent controller 110 is operably coupled the child controllers 120. As such, the patent controller 120 is configured to manage the child controllers 120. The parent controller 110 is configured to compute an E2E P2P path across the plurality of domains 130 in conjunction with the plurality of child controllers 120.

Figure 2:
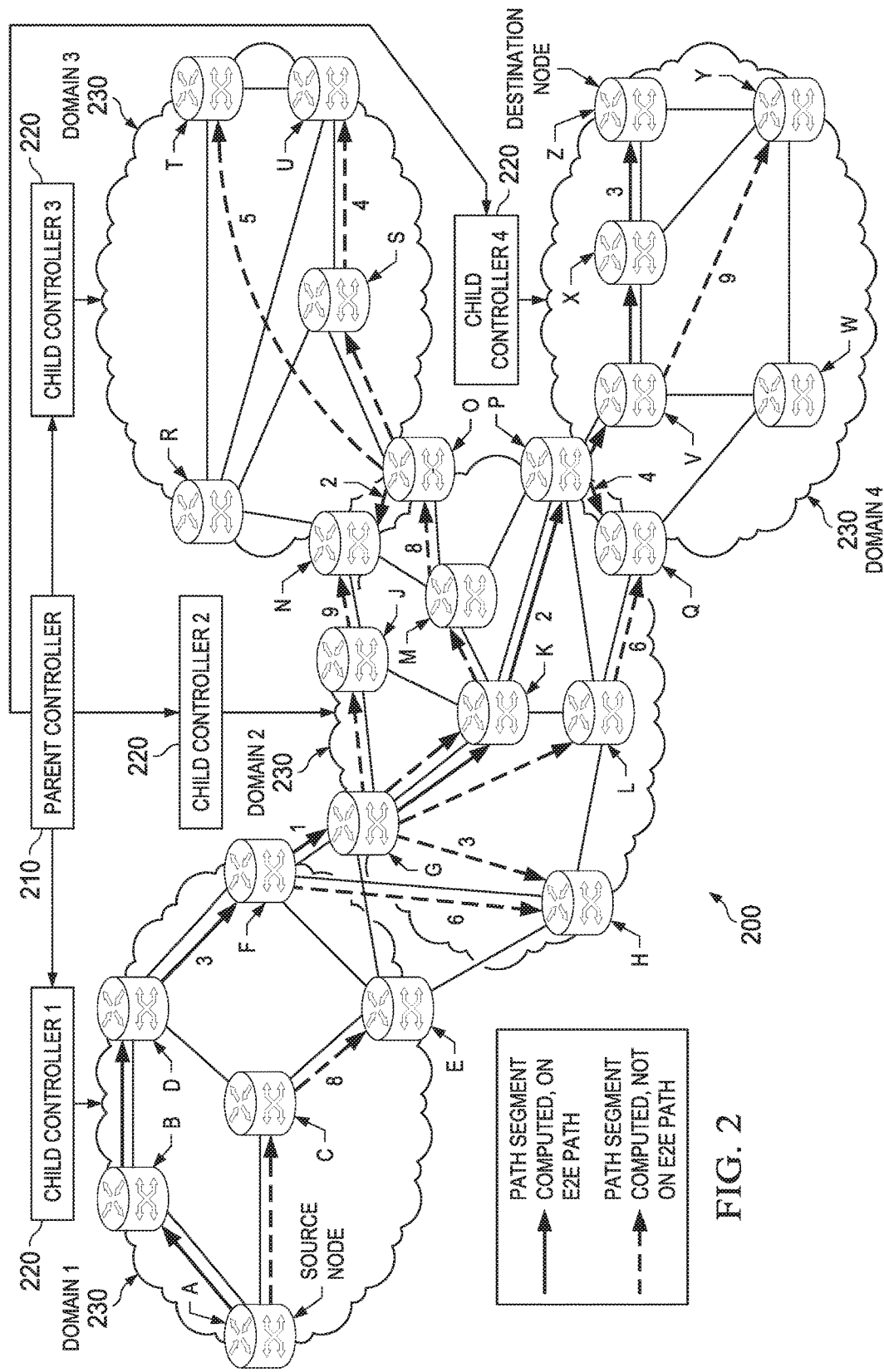
FIG. 2 is a schematic diagram of a path computation system according to an embodiment of the disclosure.

Each of the child controllers 120 is configured to compute path segments within its respective network domain 130 and/or path segments from an edge node of its domain to an edge node of a neighboring domain (e.g., from a node F in domain 1 130 to node H in domain 3 130 in FIG. 2). While child controllers 1, 2, 3, and n 120 are shown in FIG. 1, it is understood that the path computation system 100 may include any number of the child controllers 120 in practical applications.

The child controllers 120 are configured to exchange information regarding the path segments with the parent controller 110. By way of example, the child controller 1 120 is configured to compute path segments traversing the domain 1 130 between specified edge nodes and to return data to the parent controller 110 indicating the addresses of the edge nodes and routing costs for the path segments in the domain 1 130 without communicating the internal topology or internal constraints of the domain 1 130. The child controllers 1-n 120 may also update the parent controller 110 regarding topology changes that affect the edge nodes, inter-domain links, and/or computed path segment constraints. The child controllers 1-n 120 may also allocate and maintain routing tunnels and/or backup tunnels to transmit traffic along a portion of a path traversing the corresponding domains 1-n 130.

In an embodiment, each of the child controllers 1-n 120 maintains a topology database, a TE database, a forwarding information base (FIB), and/or other data structures to track the topology of the domains 1-n 130 under their control. For example, the topology may include a mapping of the connectivity of nodes and links in the domains 1-n 130, current traffic state, access point state, inter-domain link state, and any other suitable network related information. In an embodiment, a child controller 120 may control more than one of the domains 1-n 130.

The domains 1-n 130 are a group of interconnected hardware and/or software devices administered by common/shared procedures, for example, common addressing schemes, security procedures. The domains 1-n 130 are connected by inter-domain links, which are depicted as solid lines in FIG. 2, for example. An inter-domain link is any link that couples two domains via one or more edge nodes. Data may be routed between domains using the inter-domain links.

Tunnels routed over a domain 130 may satisfy various constraints, depending on the nodes and links used. Constraints for an optical domain, such as a dense wavelength division multiplexing (DWDM), may include minimum chromatic dispersion, optical crosstalk, polarization impairments, optical transmitter tuning ranges such as color constraints, directional wavelength assignment constraints, optical signal to noise ratio, quality (Q) factor of optical receivers, optical cross connect requirements in specified nodes, available wavelengths, and any other optical domain constraints. Constraints for an electrical system may include electrical crosstalk, electrical signal to noise ratio requirements, and any other electrical domain constraints. Domains 130 may also comprise policy based constraints such as required quality of service (QoS), traffic priority, bandwidth requirements, and routing cost requirements. The domains 130 comprise edge nodes configured to act as access points to the domains 1-n 130. Traffic entering or leaving each of the domains 1-n 130 passes through the edge nodes via inter-domain links. Edge nodes comprise internet protocol (IP), media access control (MAC) and/or virtual addresses that can be accessed from outside of the domains 1-n 130. The edge nodes also provide security (e.g., firewalls) for each of the domains 1-n 130. Further, some domains 130 may comprise virtual extensible networks (VxNs) or virtual machines (VMs) that operate as software on hardware and emulate hardware networks.

FIG. 2 is a schematic diagram of a path computation system 200 according to an embodiment of the disclosure. The system 200 is similar to the system 100. The system 200 comprises a parent controller 210, child controllers 1-4 220, domains 1-4 230 and nodes A-H and J-Z (i.e., edge nodes or access nodes). As shown in FIG. 2, each of the domains 230 contains a plurality of nodes (e.g., routers, switches, bridges, servers, etc.). The nodes may be any network device configured to transport data or information within or through the path computation system 200. As shown, the domain 1 230 comprises nodes A, B, C, D, E, and F, the domain 2 230 comprises nodes G, H, J, K, L, M, N, O, P, and Q, the domain 3 230 comprises nodes N, O, R, S, T, and U, and the domain 4 230 comprises nodes P, Q, V, W, X, Y, and Z. While the nodes such as nodes A, E, and F are edge nodes for domain 1 230, the domains 230 may include one or more intermediate nodes (e.g., node C in domain 1 230 or node K in domain 2 230) and links connecting the edge and intermediate nodes to each other. The links may include electrical, optical, and/or electro-optical wired connections or wireless connections, depending on the embodiment.

Depending on their position within the domain, the edge nodes may be referred to as an in-edge node or an out-edge node. An in-edge node is the node from which a path segment to another node in the same domain is computed. In other words, the in-edge node is the node at the beginning of the path segment. For example, in an E2E tunnel from node A (i.e., a source node) to node Z (i.e., a destination node), node A is an in-edge node of domain 1 230 for the path segment from node A to node F and the path segment from node A to node E.

An out-edge node is the node to which a path segment from another node in the same domain is computed, or the node to which a path segment from another node in a different domain is computed over an inter-domain link. In other words, the out-edge node is the node at the end of the path segment. For example, in an E2E tunnel from node A to node Z, node F is an out-edge node of domain 1 230 for the path segment from node A to node F. A node may function as both an in-edge node and an out-edge node in various circumstances. For example, in an E2E tunnel from node A to node Z, node P is an out-edge node of domain 2 230 for the path segment from node G to node P and an in-edge node of domain 4 230 for the path segments from node P to nodes Q, Y, and Z.

The system 200 further illustrates path segments computed by the child controllers 220 for the E2E tunnel from node A to node Z. The path segments are depicted by either solid arrows or dashed arrows. As will be more fully described below, the path segments depicted by solid arrows represent path segments computed and then selected for use in the E2E P2P path because, for example, the paths from the source to the out-edge nodes of the path segments had the lowest cost. The path segments depicted by dashed arrows represent path segments that were computed but not selected for use in the E2E P2P path because, for example, the paths from the source to the out-edge nodes of the path segments had a higher cost relative to other computed path segments. As shown, the solid arrows collectively form the E2E P2P path used to create the E2E tunnel from node A to node Z.

In an embodiment, a parameter other than cost may be used in the selection of path segments.

The process of computing and selecting path segments based on, for example, cost to establish the E2E P2P path used to create the E2E tunnel from node A to node Z in FIG. 2 is collectively illustrated in FIGS. 3A-3B, 4A-4B, 5A-5B, 6A-6B, and 7A-7B as will be described more fully below.

Figure 3A:
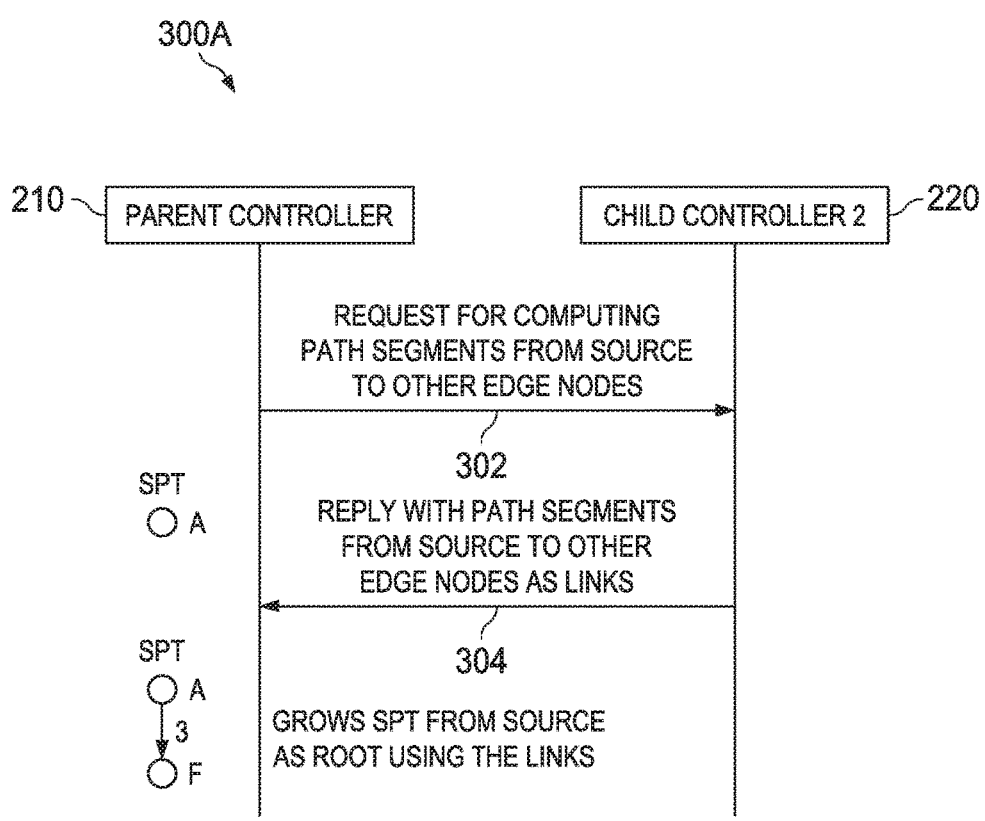
FIGS. 3A-3B are a protocol diagram and a schematic diagram collectively illustrating steps for computing that portion of the shortest E2E P2P path passing through a first domain of the path computation system of FIG. 2 according to an embodiment of the disclosure.

FIG. 3A is a protocol diagram 300A illustrating steps for computing that portion of the shortest E2E P2P path passing through domain 1 230 of the path computation system of FIG. 2 according to an embodiment of the disclosure. FIG. 3A further depicts the growth of the SPT, as will be more fully described below. FIG. 3A includes a parent controller 210 and a child controller 1 220. The parent controller 210 and the child controller 1 220 in FIG. 3A are similar to the parent controller 210 and the child controller 1 220 in FIG. 2.

Figure 3B:
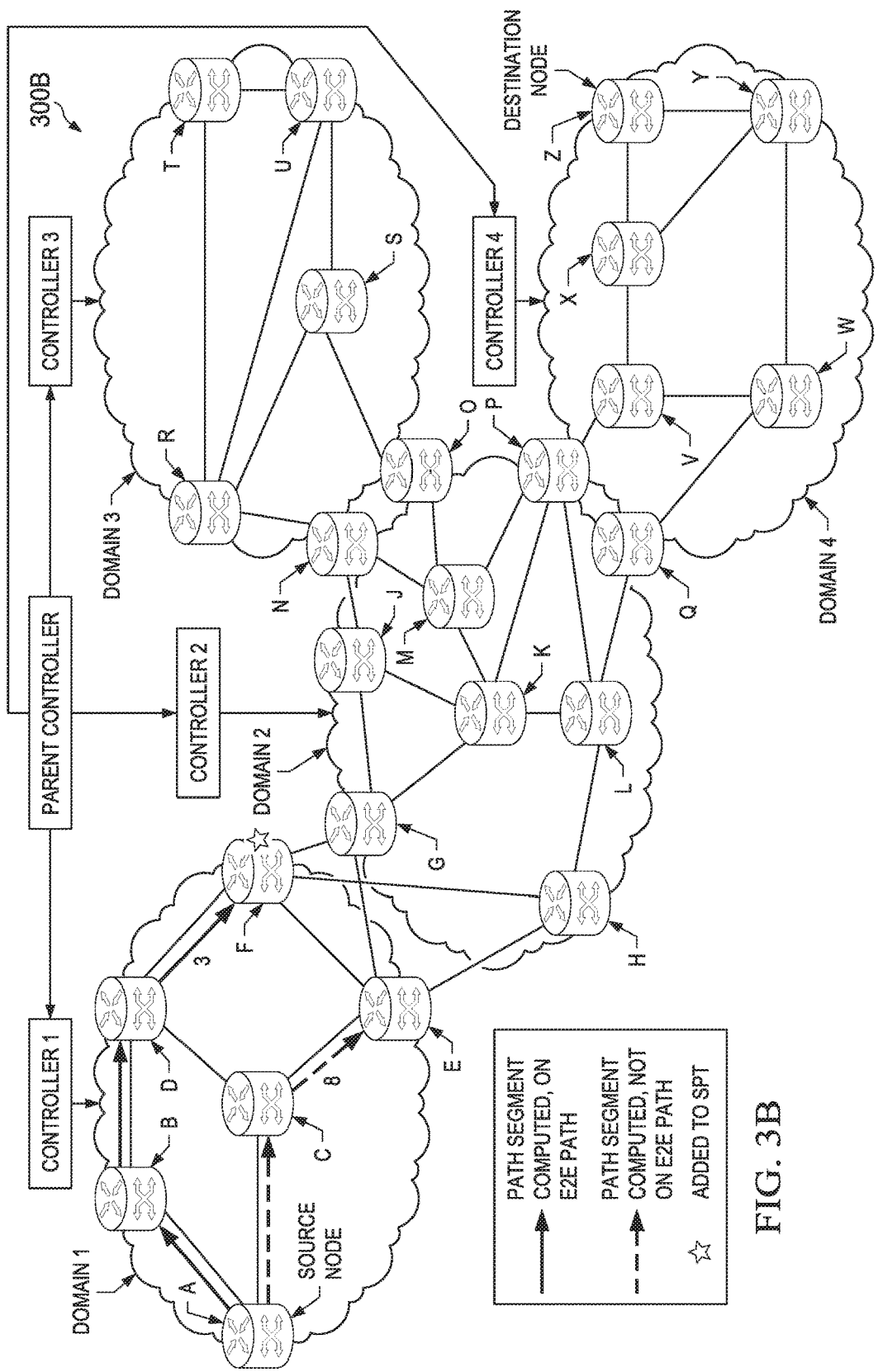

The process depicted by the protocol diagram 300A begins after the parent controller 210 receives a request for creating an E2E tunnel extending from node A to node Z. While not shown, the request may come from, for example, a client or a network administrator. In step 302, the parent controller 210 sends a message to the child controller 1 220 with an instruction to compute a shortest path segment from the in-edge node A (e.g., the source node) to each of the out-edge nodes (e.g., node E and node F) of domain 1 230 satisfying the constraints for the E2E tunnel. In response to the instruction, the child controller 1 220 determines the path segments and the corresponding costs between the in-edge node and the out-edge nodes. FIG. 3B illustrates a path computation system 300B where, for example, the child controller 1 220 calculated a path segment extending from node A to node E with cost of 8 and another path segment extending from node A to node F with cost of 3.

Once the path segments and associated costs are determined, the child controller 1 220 provides the path and cost information to the parent controller 210 as links in step 304. In an embodiment, the details of each path segment are hidden from the parent controller 210 and stored under a tunnel identification (ID) and a path ID (e.g., for example, a tunnel ID of 1015 and a path ID of 103) allocated by the parent controller 210. For example, the child controller 1 220 reports the tunnel ID, the path ID, the path segment from node A to F with a cost of 3, and the path segment from node A to E with a cost of 8 to the parent controller 210. However, the child controller 1 220 withholds the identity of the intermediate nodes (e.g., nodes B, D, C) within domain 1 230 from the parent controller 210.

The parent controller 210 adds each link corresponding to the path segment and cost to a candidate list. For example, after step 304 in FIG. 3A the candidate list includes a link that corresponds to a path segment from node A to node F with a cost of 3 and a link that corresponds to the path segment from node A to node E with a cost of 8. By way of example, the candidate list may be represented as: A→F with cost 3, and A→E with cost 8.

Because the path segment from node A to node F has a lower cost than the path segment from node A to node E, the parent controller 210 removes the out-edge node F from the candidate list and adds node F to the SPT as shown in FIG. 3A. As such, the SPT is grown from source node A to an SPT having a branch extending from source node A to node F with a cost of 3.

As shown in FIG. 3B, the path segment that was selected (e.g., from node A to node F) is shown by a solid arrow, while the path segment that was not selected (e.g., from node A to node E) is shown by a dashed arrow. In addition, node F is designated with a star to indicate that node F was added to the SPT. In an embodiment, the parent controller 210 maintains an except list (a.k.a., an exception list) that includes each of the nodes to which no path segment is computed. The except list may be transmitted to child controllers along with other messages.

Figure 4A:
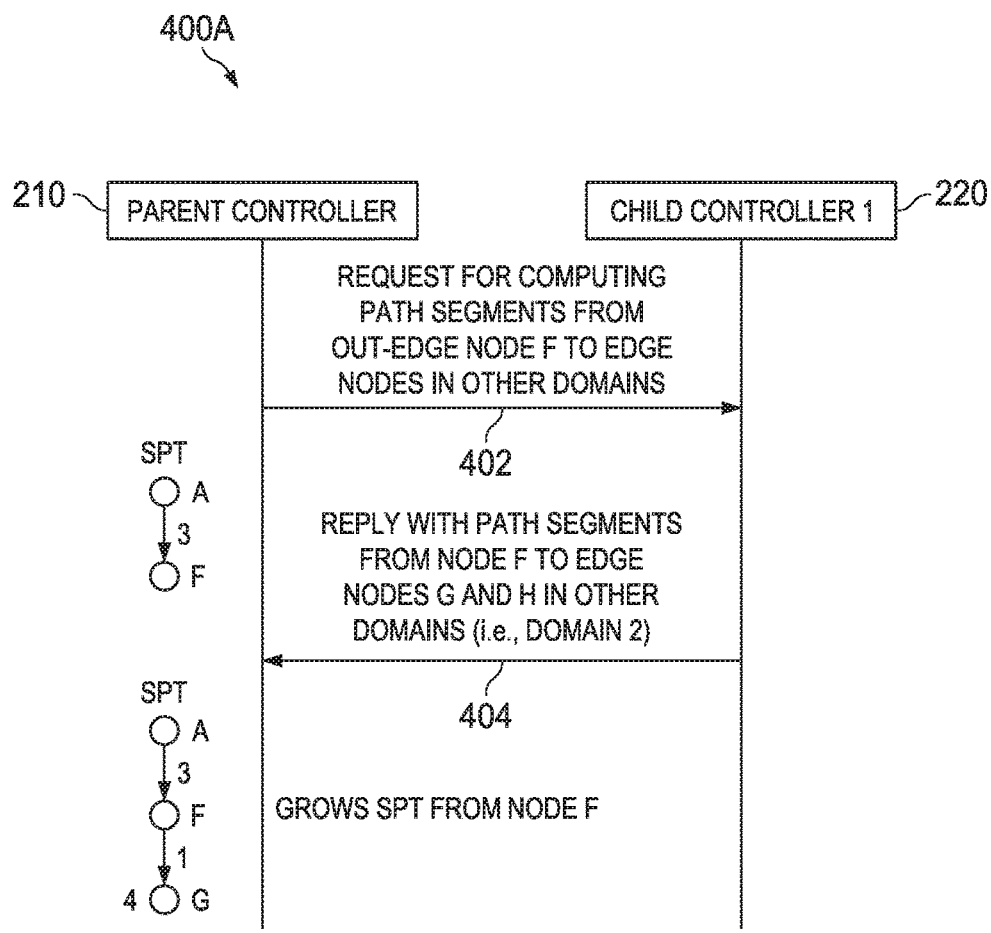
FIGS. 4A-4B are a protocol diagram and a schematic diagram collectively illustrating steps for computing that portion of the shortest E2E P2P path extending over inter-domain links between first and second domains of the path computation system of FIG. 2 according to an embodiment of the disclosure.

FIG. 4A is a protocol diagram 400A illustrating steps for computing that portion of the shortest E2E P2P path extending over inter-domain links between domain 1 230 and domain 2 230 of the path computation system of FIG. 2 according to an embodiment of the disclosure. FIG. 4A further depicts the growth of the SPT, as will be more fully described below. FIG. 4A includes a parent controller 210 and a child controller 1 220. The parent controller 210 and the child controller 1 220 in FIG. 4A are similar to the parent controller 210 and the child controller 1 220 in FIG. 2.

Figure 4B:
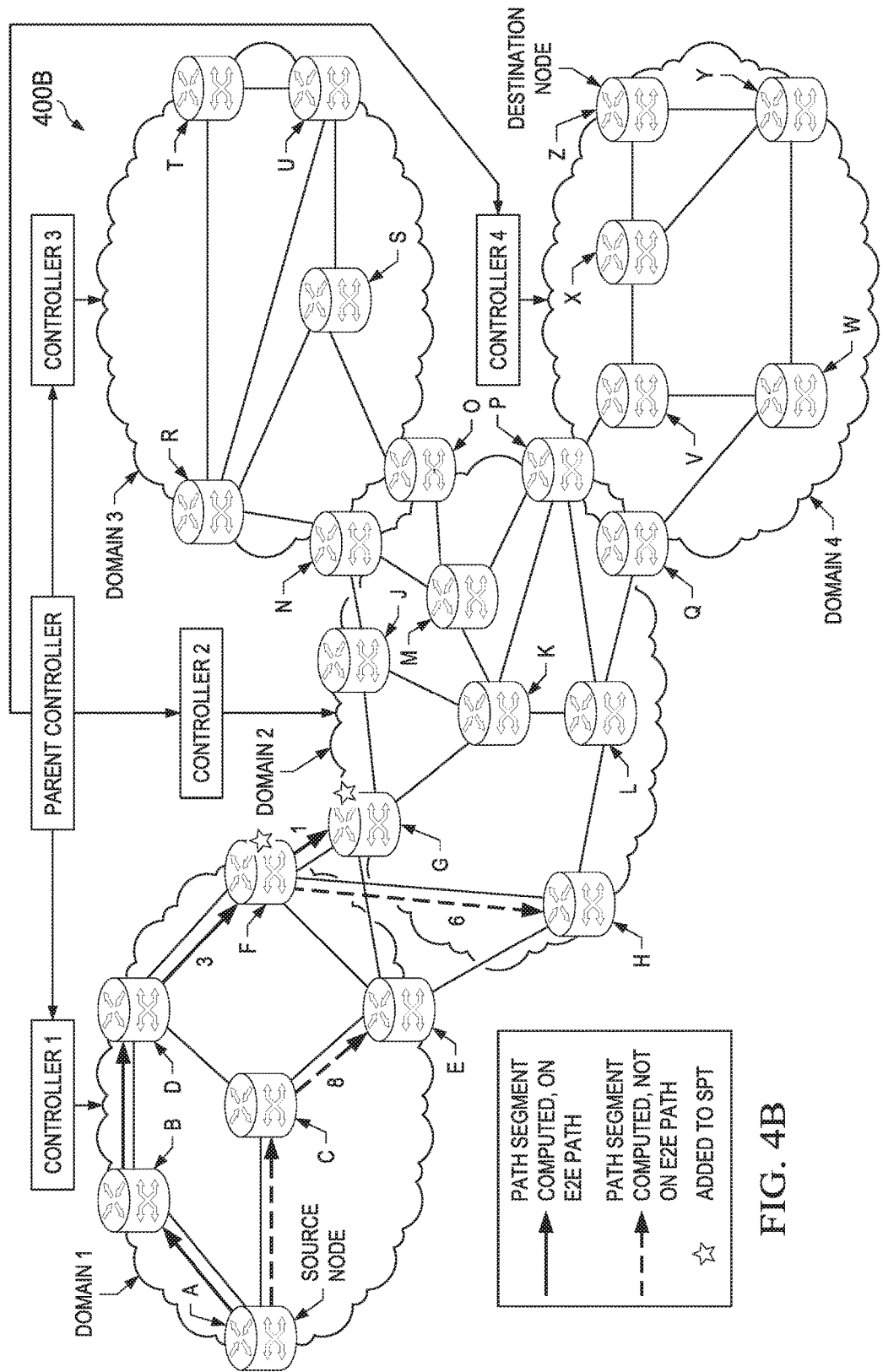

In an embodiment, the process depicted by the protocol diagram 400A begins after the process in FIG. 3A has been completed. In step 402, the parent controller 210 sends a message to the child controller 1 220 with an instruction to compute a shortest path segment from the in-edge node F of domain 1 230 to each of the out-edge nodes (e.g., node G and node H) of domain 2 230 satisfying the constraints for the E2E tunnel. In response to the instruction, the child controller 1 220 determines the path segments and the corresponding costs between the in-edge node and the out-edge nodes. FIG. 4B illustrates a path computation system 400B where, for example, the child controller 1 220 calculated a path segment extending from node F to node G with cost of 1 and another path segment extending from node F to node H with cost of 6.

Once the path segments and associated costs are determined, the child controller 1 220 provides the path and cost information to the parent controller 210 as links in step 404. In an embodiment, the details of each path segment are hidden from the parent controller 210 and stored under a tunnel ID and a path ID allocated by the parent controller 210. For example, the child controller 1 220 reports the tunnel ID, the path ID, the path segment from node F to node G with a cost of 1, and the path segment from node F to node H with a cost of 6 to the parent controller 210.

The parent controller 210 adds each link corresponding to the path segment and cost to the existing candidate list. For example, after step 404 in FIG. 4A the candidate list includes a link that corresponds to the path segment from node A to node E with a cost of 8 (previously calculated), a path segment from node A, to node F, to node G with a cost of 4 (e.g., 3+1), and a link that corresponds to the path segment from node A, to node F, to node H with a cost of 9 (e.g., 3+6). By way of example, the candidate list may be represented as: A→E with cost 8, A→F→G with cost 4, and A→F→H with cost 9.

Because the path segment associated with node G has a lower cost than the other path segments in the candidate list, the parent controller 210 removes the out-edge node G from the candidate list and adds node G to the SPT as shown in FIG. 4A. As such, the SPT is grown to include a branch extending from node F to node G with a cost of 1.

As shown in FIG. 4B, the path segment that was selected (e.g., from node F to node G) is shown by a solid arrow, while the other path segments that were not selected are shown by a dashed arrow. In addition, node G is designated with a star to indicate that node G was added to the SPT.

In an embodiment, instead of performing the process described with regard to FIGS. 4A-4B after performing the process described with regard to FIGS. 3A-3B, the parent controller 210 may request that child controller 1 220 compute path segments from node A in domain 1 230 to node G in domain 2 230. In other words, in an embodiment the parent controller 210 requests one or more of the child controllers 220 to compute path segments from the in-edge node (e.g., node A) of one domain to one or more of the in-edge nodes (e.g., node G) of an adjacent domain. In other words, two processes are combined into one in such an embodiment. In addition, in an embodiment node G is considered to be an in-edge node, but not considered to be an ingress node. This is because, for example, node G is not an ingress node relative to the entire E2E P2P path. In other words, node G is in the middle of the E2E P2P path and, as such, is not considered an ingress node despite being on the edge of domain 2 230.

Figure 5A:
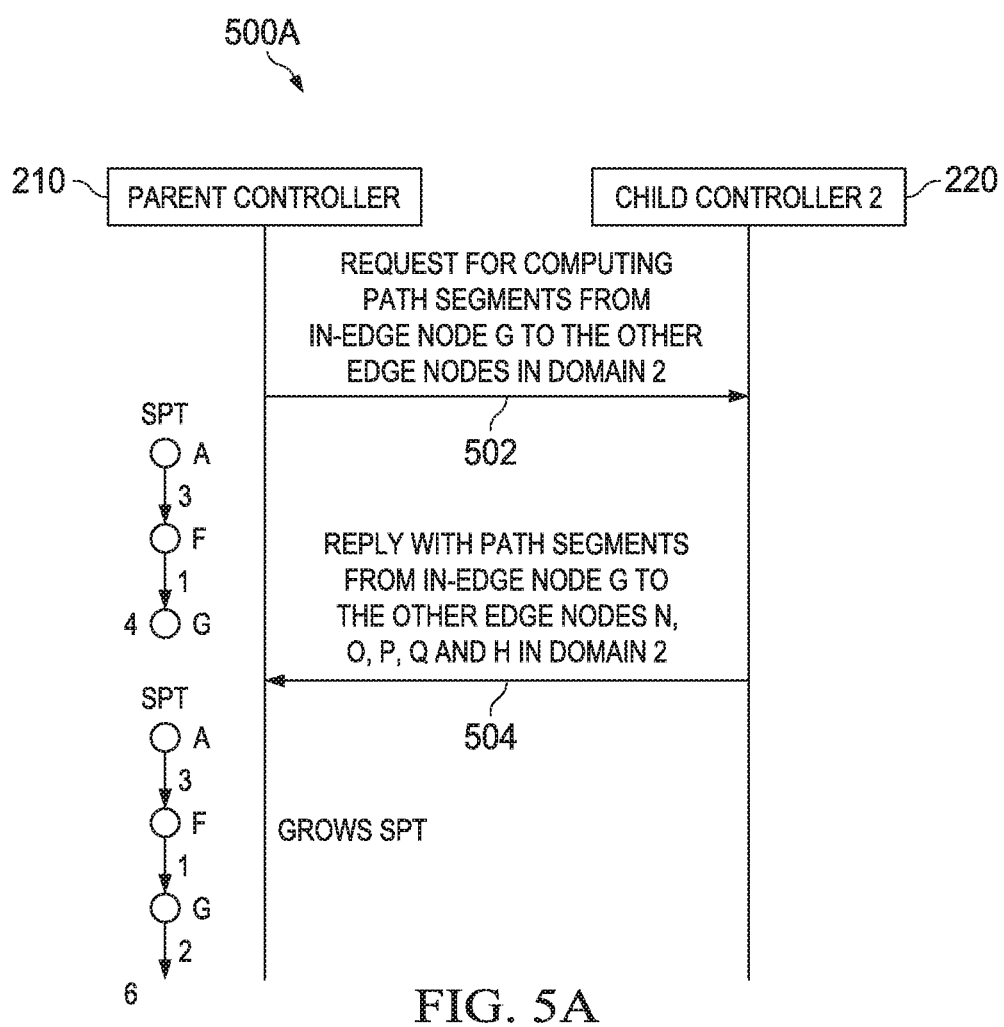
FIGS. 5A-5B are a protocol diagram and a schematic diagram collectively illustrating steps for computing that portion of the shortest E2E P2P path within the second domain of the path computation system of FIG. 2 according to an embodiment of the disclosure.

FIG. 5A is a protocol diagram 500A illustrating steps for computing that portion of the shortest E2E P2P path within domain 2 230 of the path computation system of FIG. 2 according to an embodiment of the disclosure. FIG. 5A further depicts the growth of the SPT, as will be more fully described below. FIG. 5A includes a parent controller 210 and a child controller 2 220. The parent controller 210 and the child controller 2 220 in FIG. 5A are similar to the parent controller 210 and the child controller 2 220 in FIG. 2.

Figure 5B:
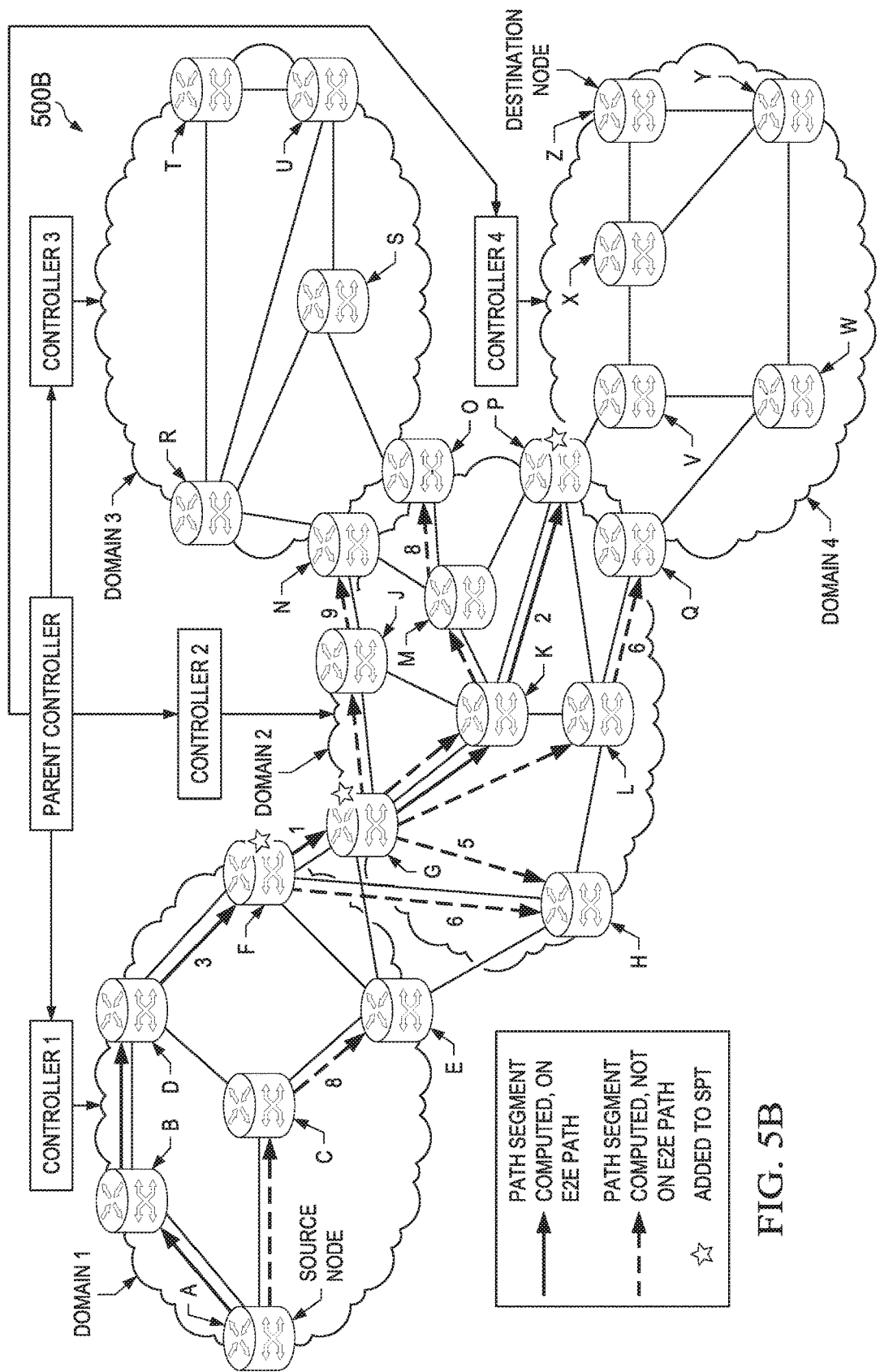

In an embodiment, the process depicted by the protocol diagram 500A begins after the process in FIG. 4A has been completed. In step 502, the parent controller 210 sends a message to the child controller 2 220 with an instruction to compute a shortest path segment from the in-edge node G of domain 2 230 to each of the out-edge nodes (e.g., node N, node O, node P, node Q, and node H) of domain 2 230 satisfying the constraints for the E2E tunnel. In response to the instruction, the child controller 2 220 determines the path segments and the corresponding costs between the in-edge nodes and the out-edge nodes. FIG. 5B illustrates a path computation system 500B where, for example, the child controller 2 220 calculated a path segment extending from node G to node N with cost of 9, a path segment extending from node G to node O with cost of 8, a path segment extending from node G to node P with cost of 2, and a path segment extending from node G to node Q with cost of 6, and a path segment extending from node G to node H with cost of 5.

Once the path segments and associated costs are determined, the child controller 2 220 provides the path and cost information to the parent controller 210 as links in step 504. In an embodiment, the details of each path segment are hidden from the parent controller 210 and stored under a tunnel ID and a path ID allocated by the parent controller 210. For example, the child controller 2 220 reports the tunnel ID, the path ID, the path segment from node G to node N with a cost of 9, the path segment from node G to node O with a cost of 8, the path segment from node G to node P with a cost of 2, the path segment from node G to node Q with a cost of 6, and the path segment from node G to node H with a cost of 5 to the parent controller 210.

The parent controller 210 adds each link corresponding to the path segment and cost to the existing candidate list. For example, after step 504 in FIG. 5A the candidate list includes a link that corresponds to the path segment from node A to node E with a cost of 8 (previously calculated), a link that corresponds to the path segment from node A, to node F, to node H with a cost of 9 (previously calculated), a path segment from node A, to node F, to node G, to node N with a cost of 13, a path segment from node A, to node F, to node G, to node O with a cost of 12, a path segment from node A, to node F, to node G, to node P with a cost of 6, and a path segment from node A, to node F, to node G, to node Q with a cost of 10. By way of example, the candidate list may be represented as: A→E with cost 8, A→F→H with cost 9, A→F→G→N with cost 13, A→F→G→O with cost 12, A→F→G→P with cost 6, and A→F→G→Q with cost 10.

Because the path segment associated with node P has a lower cost than the other path segments in the candidate list, the parent controller 210 removes the out-edge node P from the candidate list and adds node P to the SPT as shown in FIG. 5A. As such, the SPT is grown to include a branch extending from node G to node P with a cost of 2.

As shown in FIG. 5B, the path segment that was selected (e.g., from node G to node P) is shown by a solid arrow, while the other path segments that were not selected are shown by dashed arrows. In addition, node P is designated with a star to indicate that node P was added to the SPT.

Figure 6A:
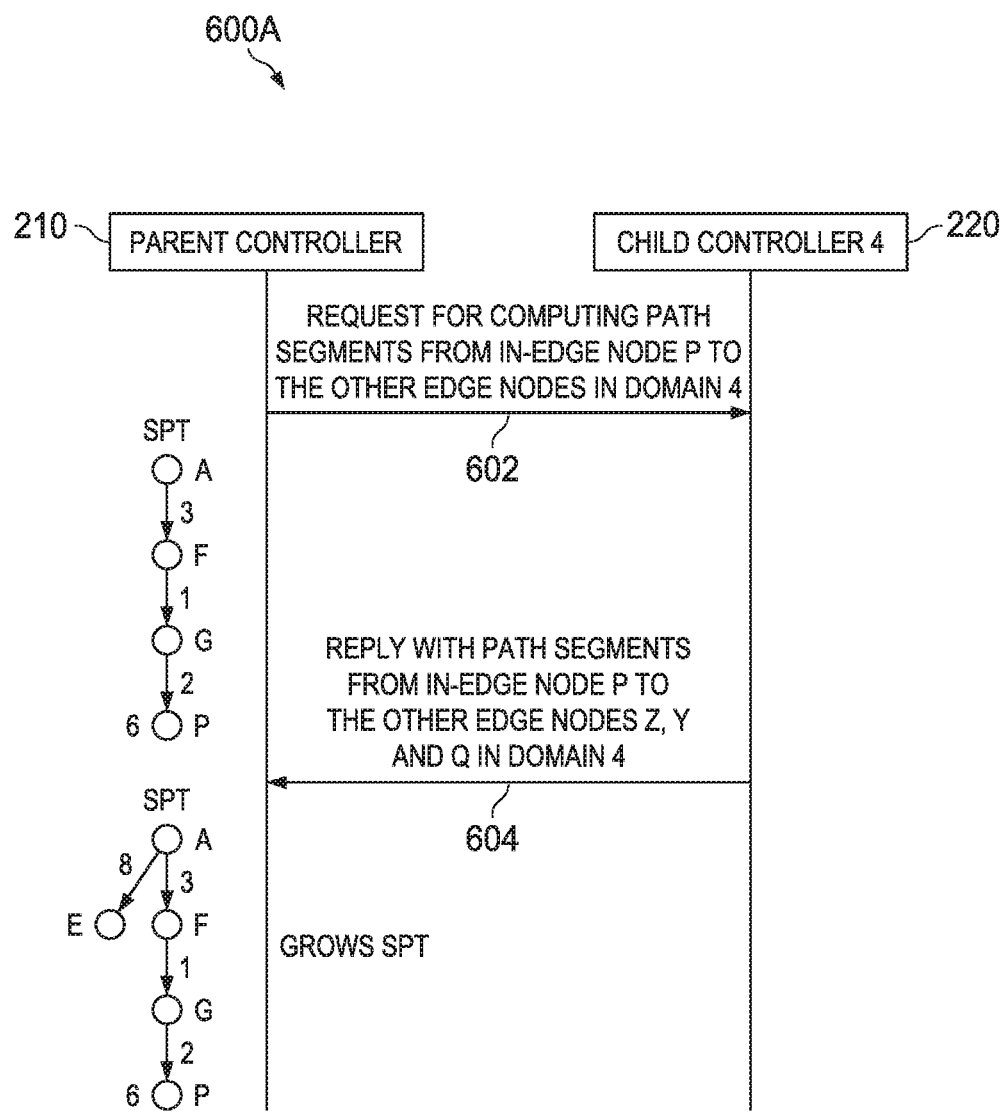
FIGS. 6A-6B are a protocol diagram and a schematic diagram collectively illustrating steps for computing that portion of the shortest E2E P2P path within a fourth domain of the path computation system of FIG. 2 according to an embodiment of the disclosure.

FIG. 6A is a protocol diagram 600A illustrating steps for computing that portion of the shortest E2E P2P path within domain 4 230 of the path computation system of FIG. 2 according to an embodiment of the disclosure. FIG. 6A further depicts the growth of the SPT, as will be more fully described below. FIG. 6A includes a parent controller 210 and a child controller 4 220. The parent controller 210 and the child controller 4 220 in FIG. 6A are similar to the parent controller 210 and the child controller 4 220 in FIG. 2.

Figure 6B:
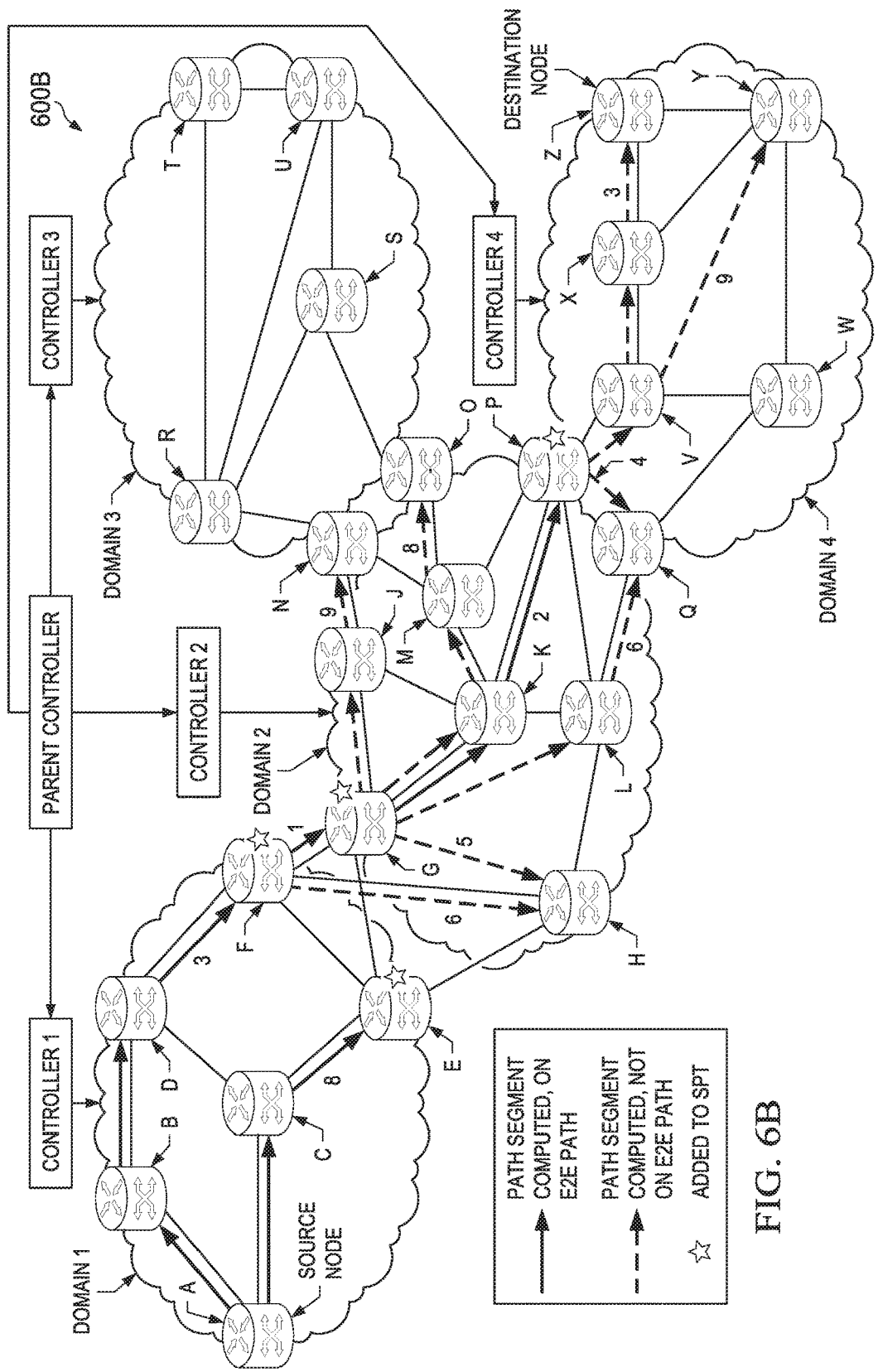

In an embodiment, the process depicted by the protocol diagram 600A begins after the process in FIG. 5A has been completed. In step 602, the parent controller 210 sends a message to the child controller 4 220 with an instruction to compute a shortest path segment from the node P, which is an in-edge node of domain 4 230 and out-edge node of domain 2 230, to each of the out-edge nodes (e.g., node Z, node Y, and node Q) of domain 4 230 satisfying the constraints for the E2E tunnel. In response to the instruction, the child controller 4 220 determines the path segments and the corresponding costs between the in-edge node (e.g., node P) and the out-edge nodes. FIG. 6B illustrates a path computation system 600B where, for example, the child controller 4 220 calculated a path segment extending from node P to node Z with cost of 3, a path segment extending from node P to node Y with cost of 9, and a path segment extending from node P to node Q with cost of 4. It should be understood that while other paths which associated costs might be calculated, only these are discussed for the sake of brevity.

Once the path segments and associated costs are determined, the child controller 4 220 provides the path and cost information to the parent controller 210 as links in step 604. In an embodiment, the details of each path segment are hidden from the parent controller 210 and stored under a tunnel ID and a path ID allocated by the parent controller 210. For example, the child controller 4 220 reports the tunnel ID, the path ID, the path segment from node P to node Z with a cost of 3, the path segment from node P to node Y with a cost of 9, and the path segment from node P to node Q with a cost of 4 to the parent controller 210.

The parent controller 210 adds each link corresponding to the path segment and cost to the existing candidate list. For example, after step 604 in FIG. 6A the candidate list includes a link that corresponds to the path segment from node A to node E with a cost of 8 (previously calculated), a link that corresponds to the path segment from node A, to node F, to node H with a cost of 9 (previously calculated), a path segment from node A, to node F, to node G, to node N with a cost of 13 (previously calculated), a path segment from node A, to node F, to node G, to node O with a cost of 12 (previously calculated), a path segment from node A, to node F, to node G, to node Q with a cost of 10 (previously calculated), a path segment from node A, to node F, to node G, to node P, to node Z with a cost of 9, and a path segment from node A, to node F, to node G, to node P, to node Y with a cost of 15. By way of example, the candidate list may be represented as: A→E with cost 8, A→F→H with cost 9, A→F→G→N with cost 13, A→F→G→O with cost 12, A→F→G→Q with cost 10, A→F→G→P→Z with cost 9, and A→F→G→P→Y with cost 15.

Because the path segment associated with node E has a lower cost than the other path segments in the candidate list, the parent controller 210 removes the out-edge node E from the candidate list and adds node E to the SPT as shown in FIG. 6A. As such, the SPT is grown to include a branch extending from node A to node E with a cost of 8.

As shown in FIG. 6B, the path segment that was selected (e.g., from node A to node E) is shown by a solid arrow (since no other lower cost path to node E exists). In addition, node E is designated with a star to indicate that node E was added to the SPT.

Figure 7A:
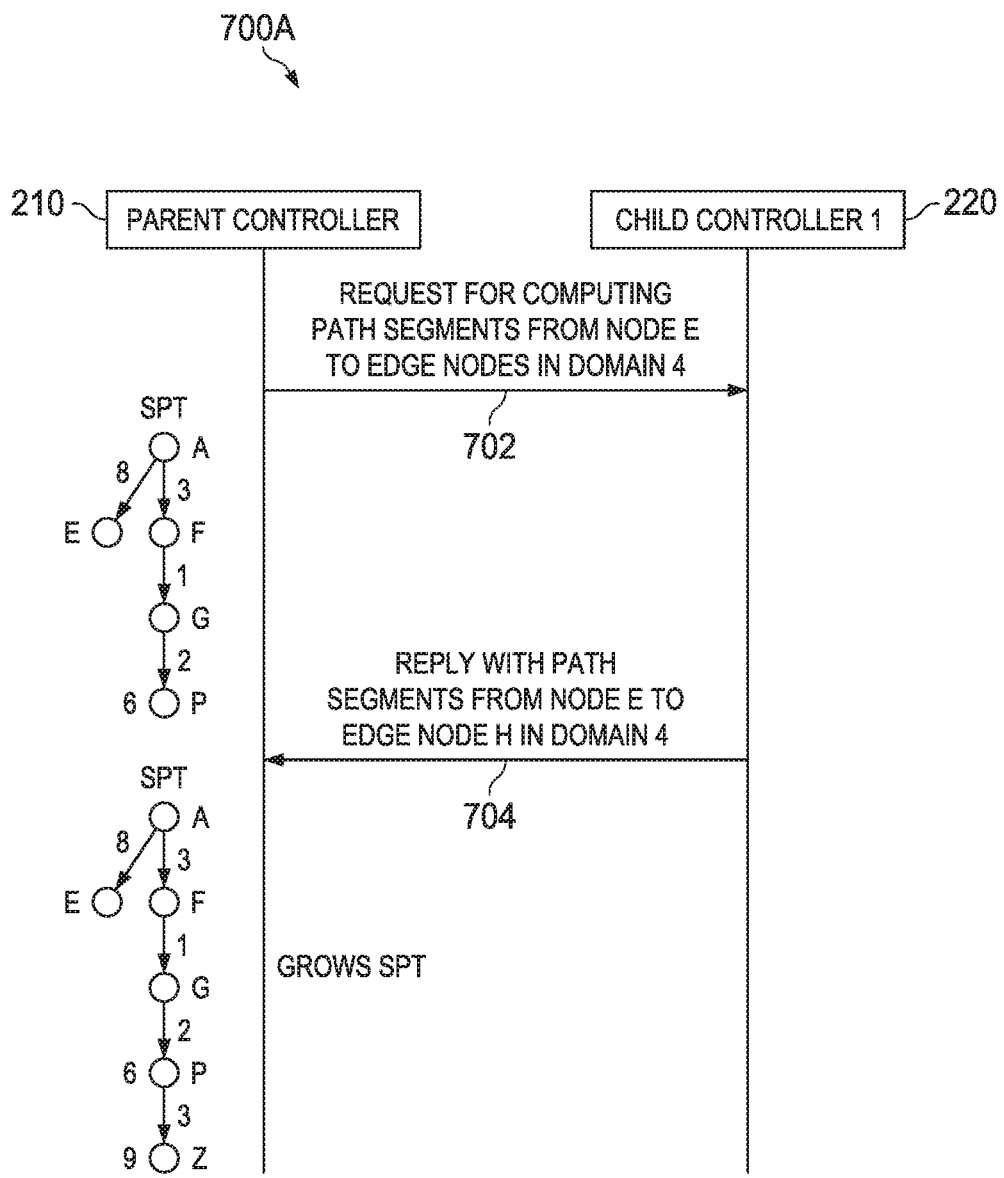
FIGS. 7A-7B are a protocol diagram and a schematic diagram collectively illustrating steps for continuing to seek the shortest E2E P2P through the path computation system of FIG. 2 according to an embodiment of the disclosure.

FIG. 7A is a protocol diagram 700A illustrating steps for continuing to seek the shortest E2E P2P through the path computation system of FIG. 2 according to an embodiment of the disclosure. FIG. 7A further depicts the growth of the SPT, as will be more fully described below. FIG. 7A includes a parent controller 210 and a child controller 1 220. The parent controller 210 and the child controller 1 220 in FIG. 7A are similar to the parent controller 210 and the child controller 1 220 in FIG. 2.

Figure 7B:
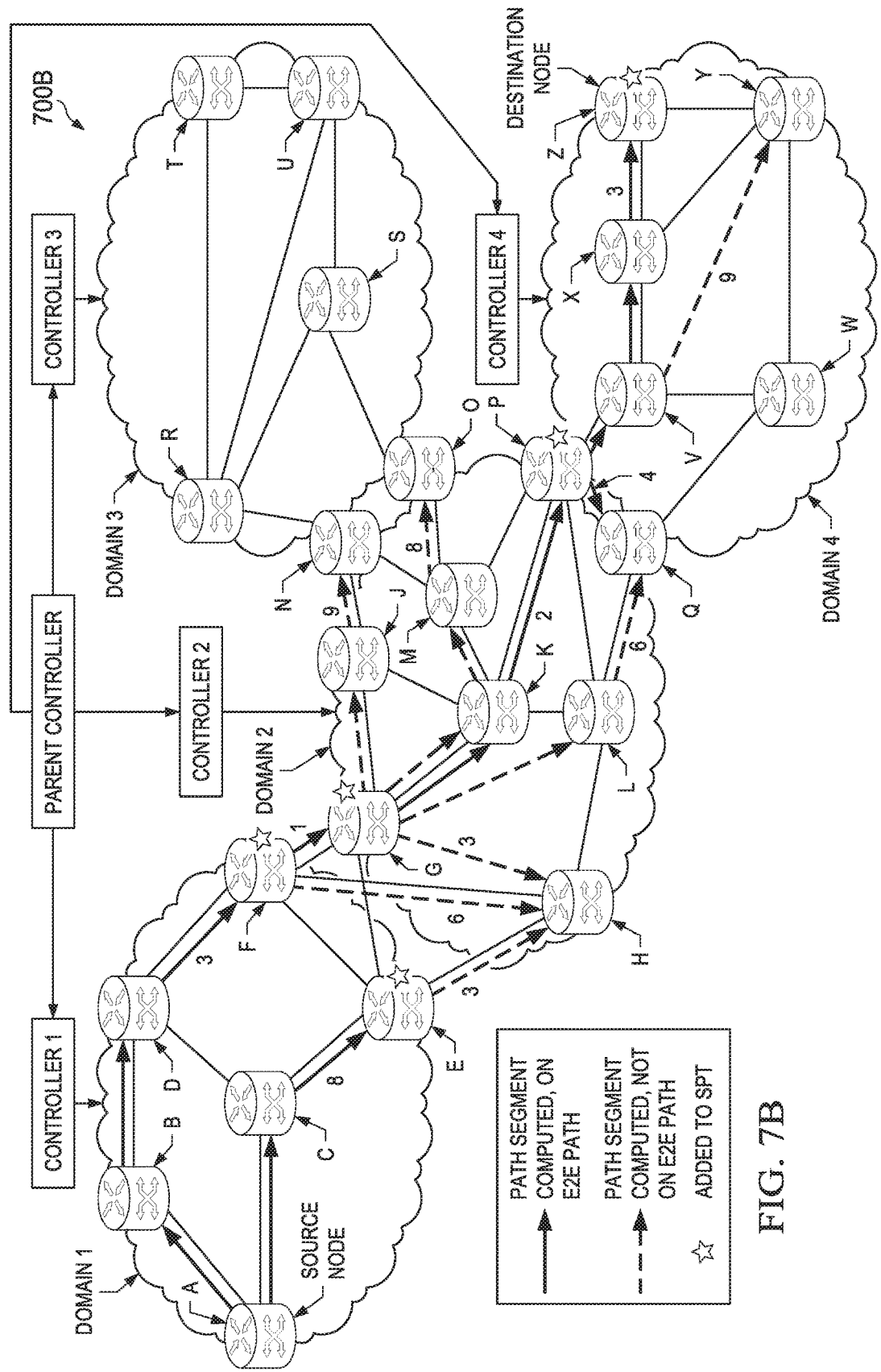

In an embodiment, the process depicted by the protocol diagram 700A begins after the process in FIG. 6A has been completed. In step 702, the parent controller 210 sends a message to the child controller 1 220 with an instruction to compute a shortest path segment from the in-edge node E of domain 1 230 to the out-edge node (e.g., node H) of domain 2 230 satisfying the constraints for the E2E tunnel. In response to the instruction, the child controller 1 220 determines the path segment and the corresponding cost between the in-edge node and the out-edge node. FIG. 7B illustrates a path computation system 700B where, for example, the child controller 1 220 calculated a path segment extending from node E to node H with a cost of 3.

Once the path segment and associated cost is determined, the child controller 1 220 provides the path and cost information to the parent controller 210 as a link in step 704. In an embodiment, the details of the path segment are hidden from the parent controller 210 and stored under a tunnel ID and a path ID allocated by the parent controller 210. For example, the child controller 1 220 reports the tunnel ID, the path ID, the path segment from node E to H with a cost of 3 to the parent controller 210.

The parent controller 210 adds the link corresponding to the path segment and cost to the existing candidate list. For example, after step 704 in FIG. 7A the candidate list includes a link that corresponds to the path segment from node A, to node F, to node H with a cost of 9 (previously calculated), a path segment from node A, to node F, to node G, to node N with a cost of 13 (previously calculated), a path segment from node A, to node F, to node G, to node O with a cost of 12 (previously calculated), a path segment from node A, to node F, to node G, to node Q with a cost of 10 (previously calculated), a path segment from node A, to node F, to node G, to node P, to node Z with a cost of 9, and a path segment from node A, to node F, to node G, to node P, to node Y with a cost of 15. By way of example, the candidate list may be represented as: A→F→H with cost 9, A→F→G→N with cost 13, A→F→G→O with cost 12, A→F→G→Q with cost 10, A→F→G→P→Z with cost 9, and A→F→G→P→Y with cost 15.

Because the path segment associated with node Z has a cost that is equal to or less than the other path segments in the candidate list, the parent controller 210 removes the out-edge node Z from the candidate list and adds node Z to the SPT as shown in FIG. 7A. As such, the SPT is grown to include a branch extending from node P to node Z with a cost of 3. Because node Z is the destination node, the lowest cost path from A to Z has been found and a corresponding E2E tunnel may be established along the path.

As shown in FIG. 7B, the path segment that was selected (e.g., from node P to node Z) is shown by a solid arrow, while the other path segments that were not selected are shown by dashed arrows. In addition, node Z is designated with a star to indicate that node Z was added to the SPT.

Figure 8:
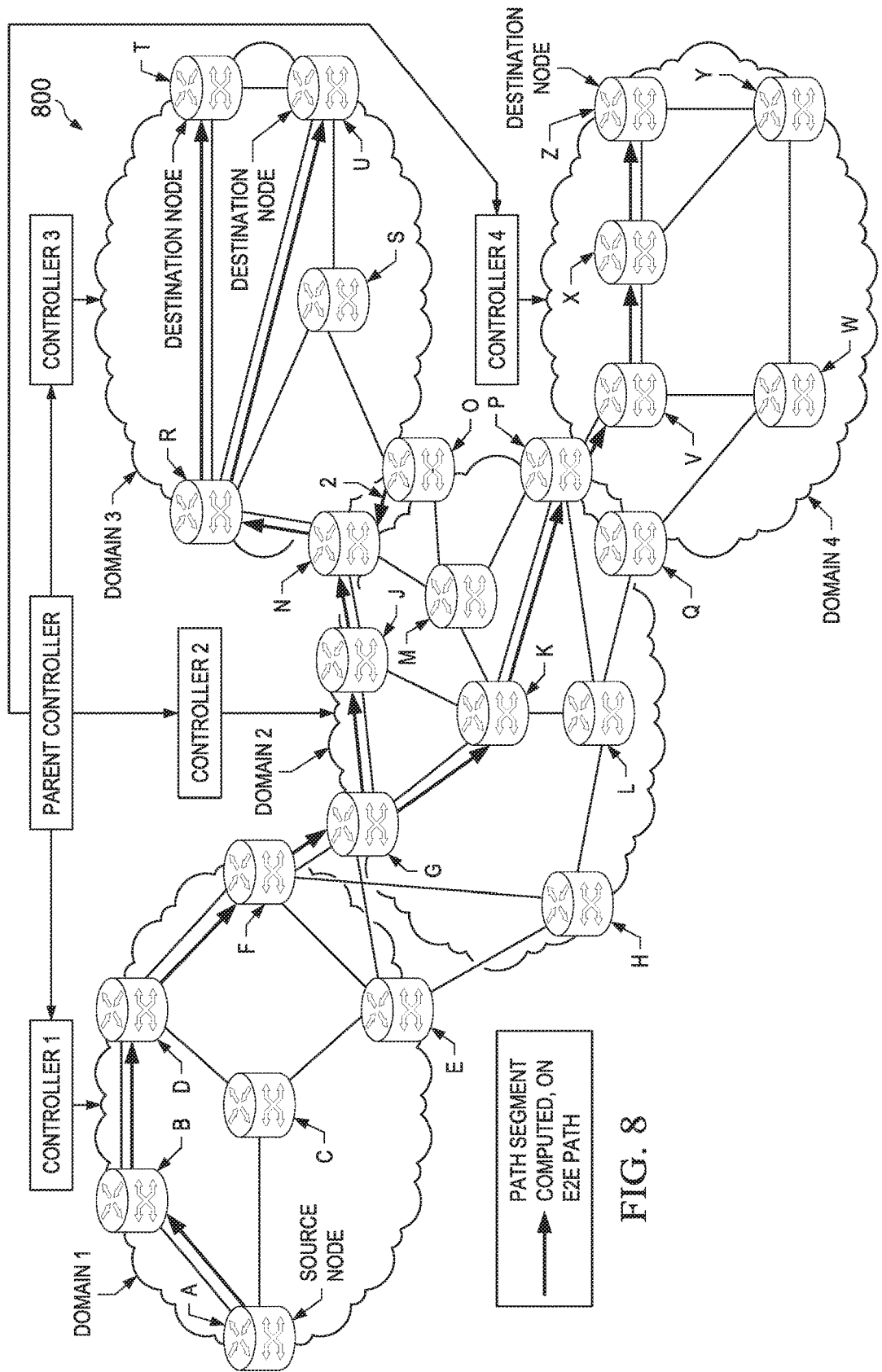
FIG. 8 is a schematic diagram illustrating shortest point-to-multipoint (P2MP) paths computation in the path computation system in FIG. 2 according to an embodiment of the disclosure.

FIG. 8 is a schematic diagram 800 illustrating a shortest point-to-multipoint (P2MP) path computation in path computation system 200 of FIG. 2 according to an embodiment of the disclosure. FIG. 8 includes a parent controller 210, child controllers 1-4 220, domains 1-4 230 and nodes A-H and J-Z. The parent controller 210 and the child controllers 220 in FIG. 8 are similar to the parent controller 210 and the child controllers 220 in FIG. 2, and the domains 230 in FIG. 8 are similar to the domains 230 in FIG. 2. In an embodiment, the shortest P2MP path computation comprises a number of the E2E P2P path computations. In other words, the E2E P2P path computation concept may be extended to find a shortest E2E P2MP path. For example, FIG. 8 comprises a number of shortest E2E P2P paths extending from node A (e.g., the source node) to nodes T, U, and Z (e.g., the destination nodes) as shown in FIG. 8. The process of computing and selecting the P2MP paths based on, for example, cost is similar to the process described above in FIGS. 3A-3B, 4A-4B, 5A-5B, 6A-6B, and 7A-7B to establish the E2E P2P path for the E2E tunnel. In an embodiment, the shortest P2MP path computation grows its SPT until all the destination nodes are on the SPT as opposed to E2E P2P path computation, which grows the SPT to a single destination node.

Once the shortest E2E P2P path or the shortest E2E P2MP paths are determined in the manner noted above, the parent controller 210 creates the E2E tunnel. For the sake of brevity, only the manner in which the E2E tunnel along the E2E P2P path will be discussed in detail. Even so, those skilled in the art will appreciate the manner in which the E2E tunnel along the E2E P2MP path is created upon reviewing this disclosure.

The parent controller 210 creates the E2E tunnel by instructing the child controllers 220 to establish the E2E tunnel along the shortest E2E P2P path in a reverse direction from node Z to node A. For example, the parent controller 210 instructs the child controller 4 220 (e.g., the destination controller) to create a tunnel segment in the domain 4 230 (e.g., the destination domain), then instructs the child controller 2 220 to create the tunnel segment in the domain 2 230, and so on. A detailed process of creating the E2E tunnel extending from node A to node Z in FIG. 2 is collectively illustrated in FIGS. 9A-9B, 10A-10B, and 11A-11B and will be described more fully below.

Figure 9A:
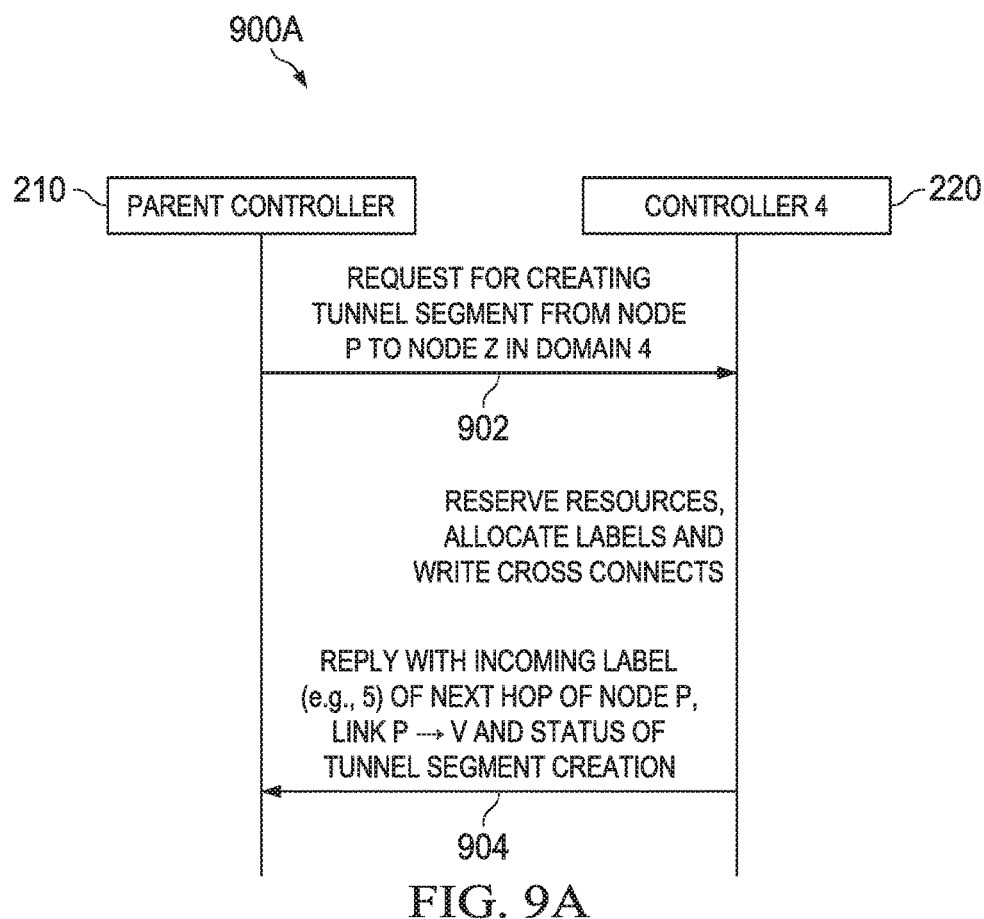
FIGS. 9A-9B are a protocol diagram and a schematic diagram collectively illustrating steps for creating that portion of the E2E tunnel passing through the fourth domain of the path computation system of FIG. 2 according to an embodiment of the disclosure.

FIG. 9A is a protocol diagram 900A illustrating steps for creating that portion of the E2E tunnel passing through domain 4 230 of the path computation system of FIG. 2 according to an embodiment of the disclosure. FIG. 9A includes a parent controller 210 and a child controller 4 220. The parent controller 210 and the child controller 4 220 in FIG. 9A are similar to the parent controller 210 and the child controller 4 220 in FIG. 2.

Figure 9B:
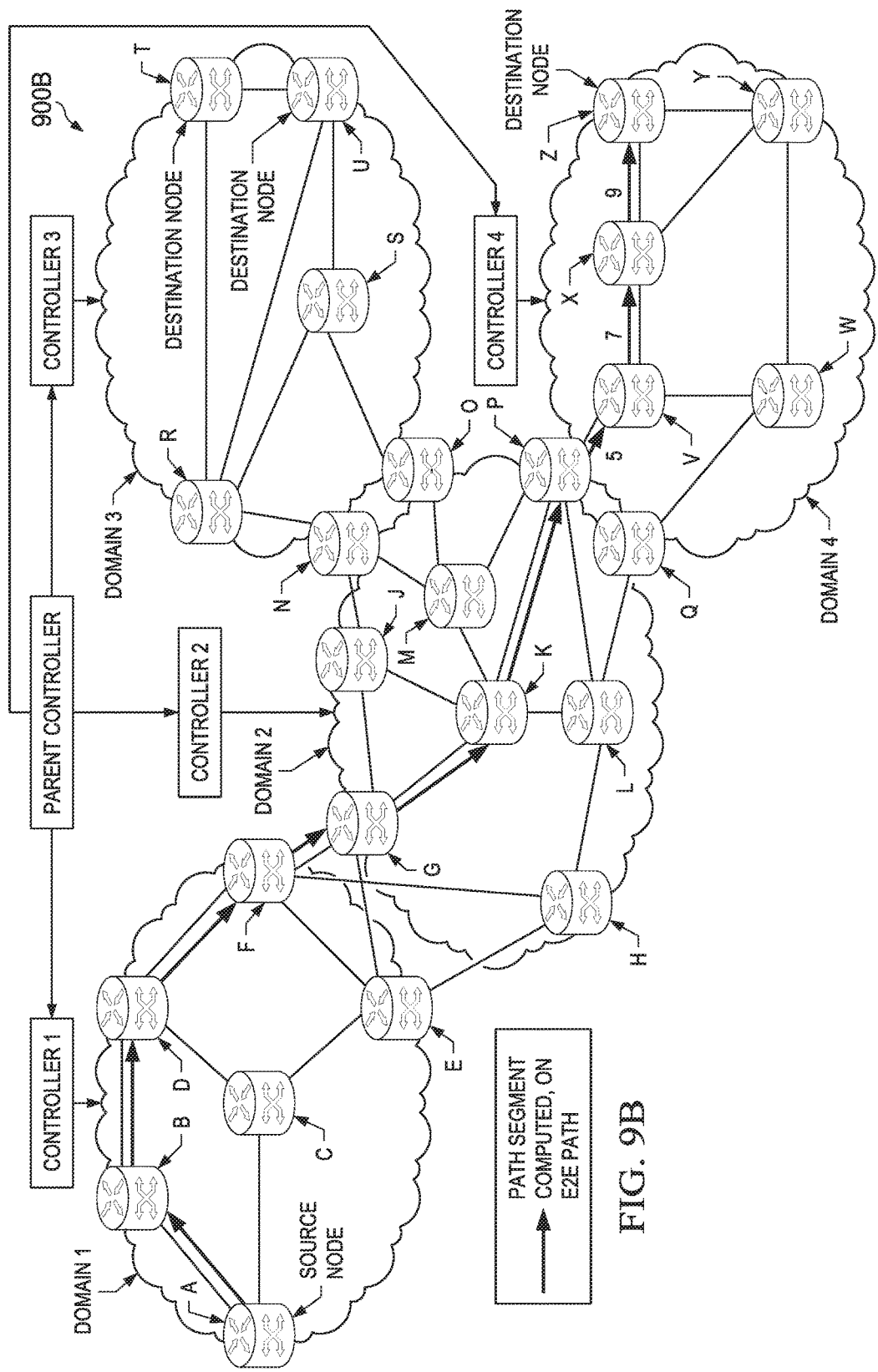

The process depicted by the protocol diagram 900A begins after the parent controller 210 determines that the SPT has grown to include node Z (e.g., the destination node). In step 902, the parent controller 210 sends a message to the child controller 4 220 with an instruction to create a tunnel segment in domain 4 230 from the node P to the node Z. In an embodiment, the parent controller 210 allocates a global tunnel ID and a path ID corresponding to the domain and includes the global tunnel ID and the path ID in the message to the child controller 4 220. In response to the instruction, the child controller 4 220 creates the tunnel segment by reserving resources (e.g., link bandwidth), allocating incoming labels, and writing cross connects on every node along the tunnel segment. FIG. 9B illustrates a path computation system 900B where, for example, the child controller 4 220 created a tunnel segment extending from node P to node Z.

By way of example as shown in FIG. 9B, the child controller 4 220 reserves the resources on the link from P to V, the link from V to X, and the link from X to Z. In addition, the child controller 4 220 allocates incoming label 9 for the node Z and the link from X to Z, incoming label 7 for the node X and the link from V to X, and incoming label 5 for the node V and the link P to V. The child controller 4 220 also writes cross connect in-label 5 switching to out-label 7 on the node V, cross connect in-label 7 switching to out-label 9 on the node X, and a pop in-label 9 on the node Z.

Returning to FIG. 9A, once the tunnel segment in the domain is created, the child controller 4 220 provides the outgoing label (e.g., 5) of node P, the link P→V, and the tunnel segment creation status to the parent controller 210 in step 904. The outgoing label of node P is the incoming label of the next hop V of node P. In an embodiment, the parent controller 210 sends the outgoing label and the links (e.g., link P→V) to upstream or intermediate child controllers (e.g., child controller 2 220) for creating intermediate tunnel segments.

Figure 10A:
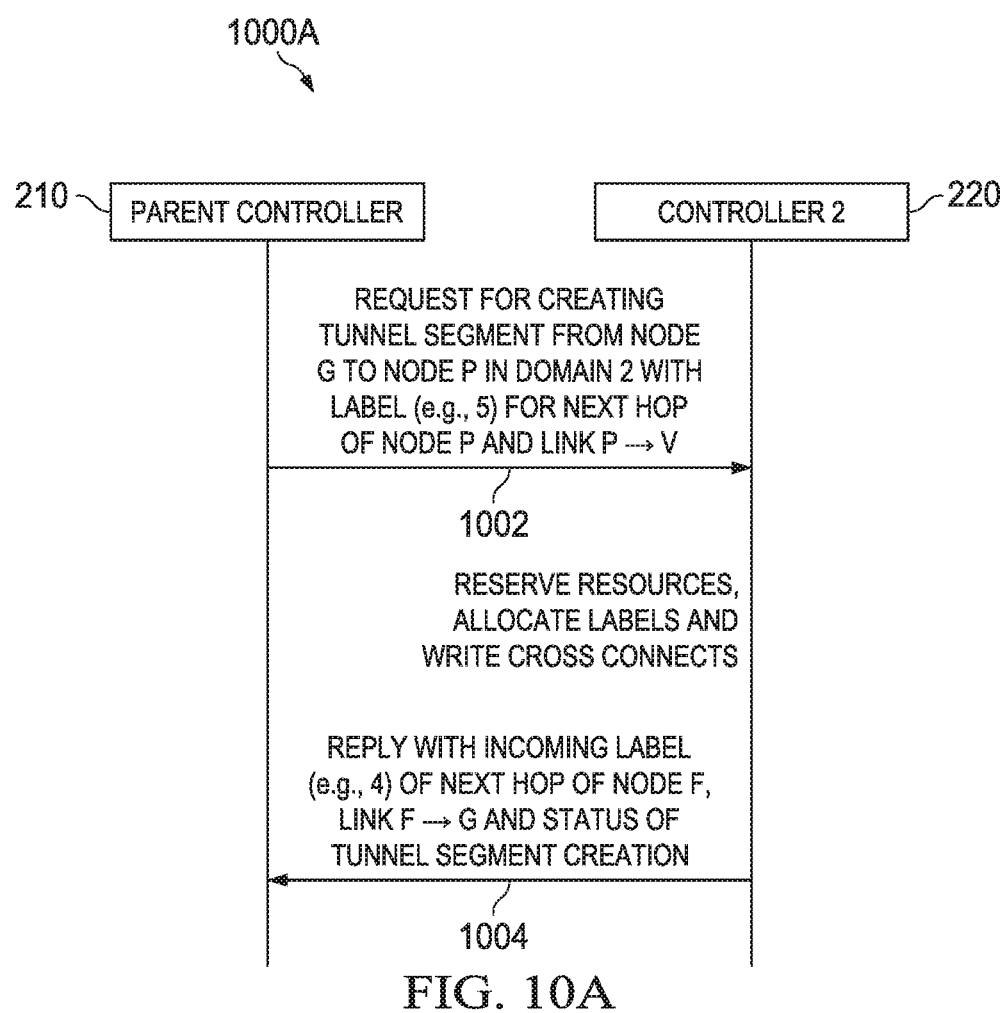
FIGS. 10A-10B are a protocol diagram and a schematic diagram collectively illustrating steps for creating that portion of the E2E tunnel over inter-domain link from node F to node G and extending node G to node P in the fourth domain of the path computation system of FIG. 2 according to an embodiment of the disclosure.

FIG. 10A is a protocol diagram 1000A illustrating steps for creating that portion of the E2E tunnel over inter-domain link from node F to node G and extending node G to node P in domain 4 230 of the path computation system of FIG. 2 according to an embodiment of the disclosure. FIG. 10A includes a parent controller 210 and a child controller 2 220. The parent controller 210 and the child controller 2 220 in FIG. 10A are similar to the parent controller 210 and the child controller 2 220 in FIG. 2.

Figure 10B:
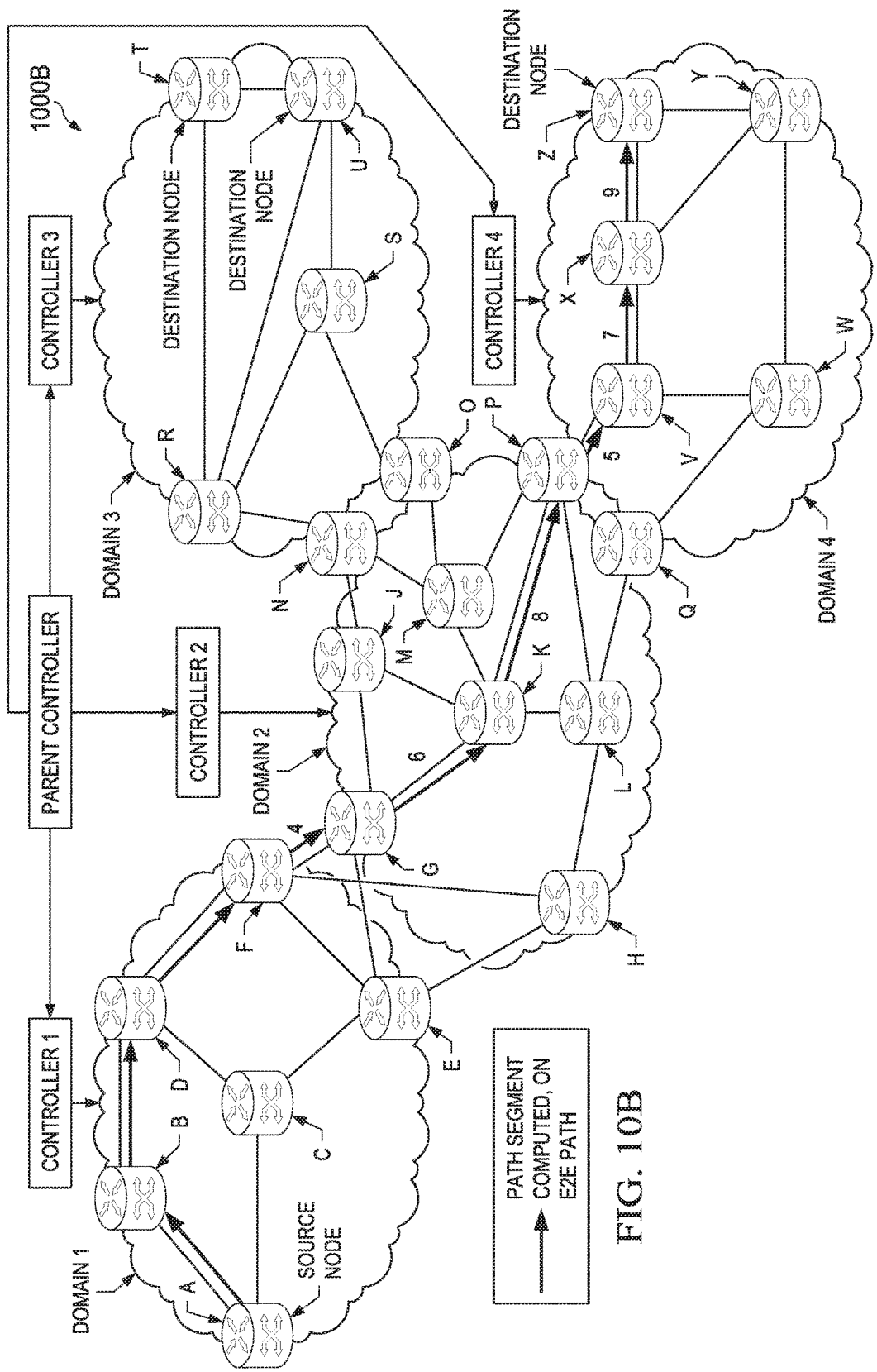

In an embodiment, the process depicted by the protocol diagram 1000A begins after the process in FIG. 9A has been completed. In step 1002, the parent controller 210 sends a message to the child controller 2 220 with an instruction which includes the global tunnel ID and path ID to create a tunnel segment from node G to node P. While not shown, the message further includes creating the tunnel segment over inter-domain link from node F to node G. In response to the instruction, the child controller 2 220 creates the tunnel segment by reserving the resources, allocating incoming labels, and writing cross connects on every node along the tunnel segment. FIG. 10B illustrates a path computation system 1000B where, for example, the child controller 2 220 created a tunnel segment extending from node F to node P.

By way of example as shown in FIG. 10B, the child controller 2 220 reserves the resources on every link identified by the path ID, such as link from F to G, link from G to K, and link from K to P. In addition, the child controller 2 220 allocates incoming label 8 for the node P and link from K to P, incoming label 6 for the node K and link from G to K, and incoming label 4 for the node G and link from F to G. The child controller 2 220 also writes cross connect in-label 4 switching to out-label 6 on the node G, in-label 6 switching to out-label 8 on the node K, and in-label 8 switching to out-label 5 on the node P.

Returning to FIG. 10A, once the tunnel segment in the intermediate domain is created, the child controller 2 220 provides the outgoing label (e.g., 4) of node F, link F→G, and the tunnel segment creation status to the parent controller 210 in step 1004. The outgoing label of node F is the incoming label of the next hop node G of node F.

Figure 11A:
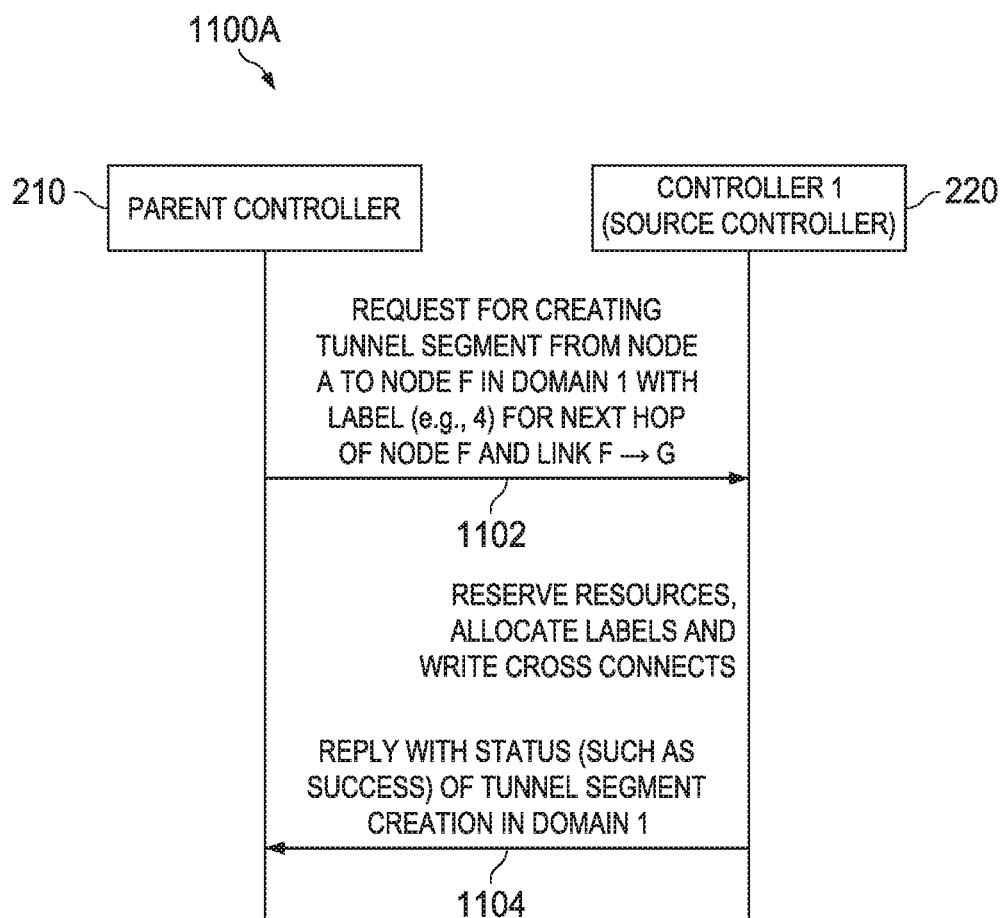
FIGS. 11A-11B are a protocol diagram and a schematic diagram collectively illustrating steps for creating that portion of the E2E tunnel within first domain of the path computation system of FIG. 2 according to an embodiment of the disclosure.

FIG. 11A is a protocol diagram 1100A illustrating steps for creating that portion of the E2E tunnel within domain 1 230 of the path computation system of FIG. 2 according to an embodiment of the disclosure. FIG. 11A includes a parent controller 210 and a child controller 1 220. The parent controller 210 and the child controller 1 220 in FIG. 11A are similar to the parent controller 210 and the child controller 1 220 in FIG. 2.

Figure 11B:
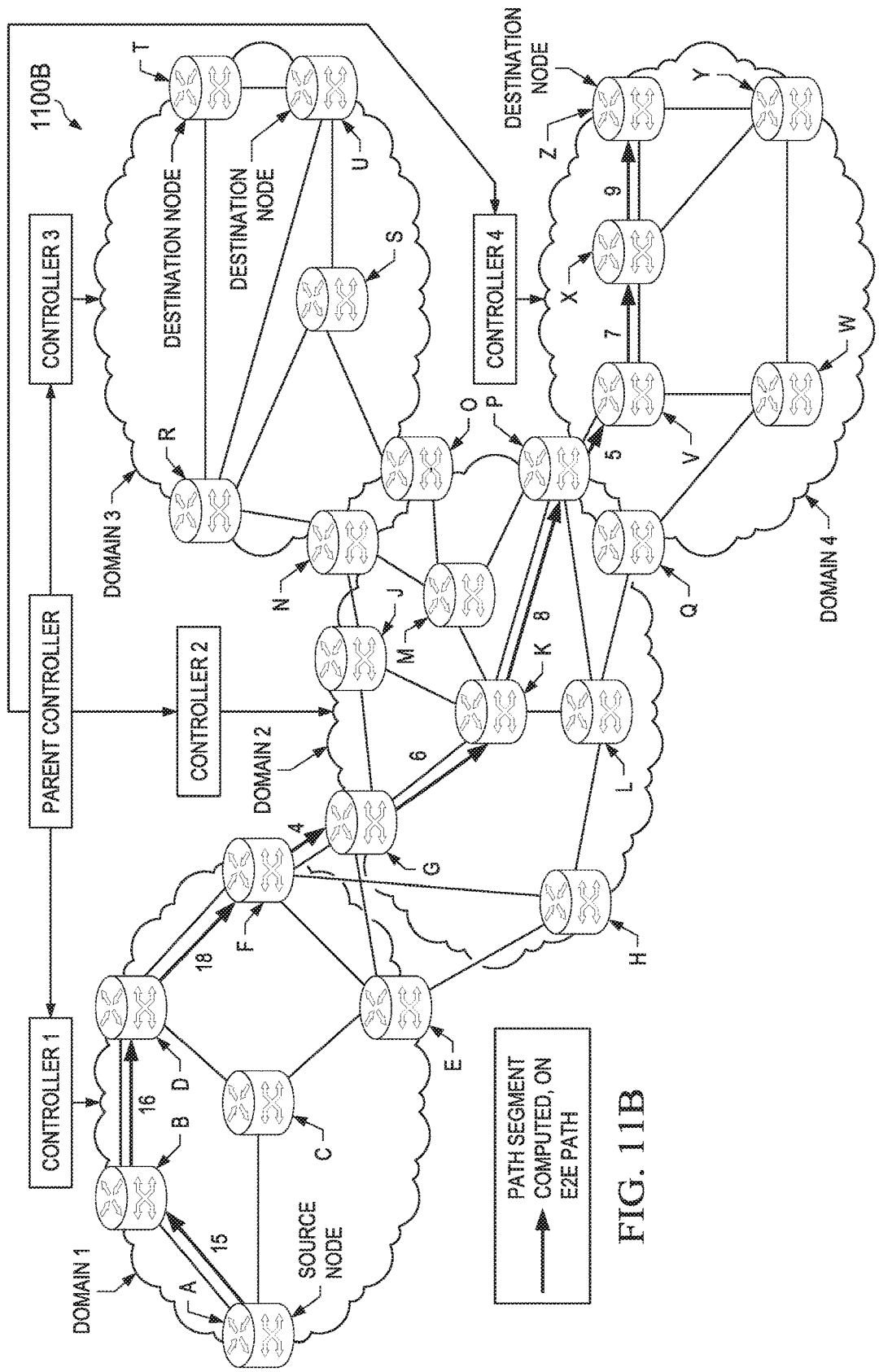

In an embodiment, the process depicted by the protocol diagram 1100A begins after the process in FIG. 10A has been completed. In step 1102, the parent controller 210 sends a message to the child controller 1 220 with an instruction to create a tunnel segment from node A to node F in domain 1 230. In response to the instruction, the child controller 1 220 creates the tunnel segment by reserving resources, allocating incoming labels, and writing cross connects on every node along the tunnel segment. FIG. 11B illustrates a path computation system 1100B where, for example, the child controller 1 220 created a tunnel segment extending from node A to node F.

By way of example as shown in FIG. 11B, the child controller 1 220 reserves resources on every link identified by the path ID, such as link from D to F, link from B to D, and link from A to B. In addition, the child controller 1 220 allocates incoming label 18 for the node F and the link from D to F, incoming label 16 for the node D and the link from B to D, and incoming label 15 for the node B and link from A to B. The child controller 1 220 writes the cross connect push label 15 on the node A, in-label 15 switching to out-label 16 on the node B, in-label 16 switching to out-label 18 on the node D, and in-label 18 switching to out-label 4 on the node F.

Returning to FIG. 11A, once the tunnel segment is created, the child controller 1 220 provides the tunnel segment creation status (e.g., success) in domain 1 230 back to the parent controller 210. As such, the E2E tunnel from the node A to the node Z is created successfully after the parent controller 210 receives the reply with success from the child controller 1 220. Therefore, by using the shortest P2P path computation to establish the E2E tunnel, data communication achieves better efficiency (e.g., routing cost), reduces complex communication among components, and increases network resource usage.

Figure 12:
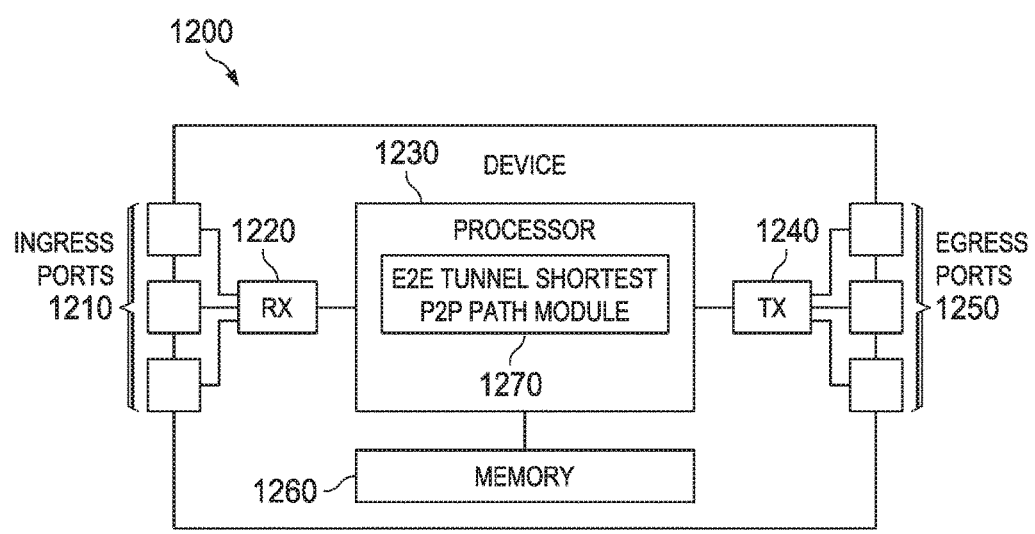
FIG. 12 is a schematic diagram of an apparatus configured to implement one or more of the methods disclosed herein according to an embodiment of the disclosure.

FIG. 12 is a schematic diagram of an apparatus 1200 configured to implement one or more of the methods disclosed herein according to an embodiment of the disclosure. The apparatus 1200 is suitable for implementing the disclosed embodiments, for instance the system 100 or the system 200. The apparatus 1200 comprises ingress ports 1210 and receiver units (Rx) 1220 for receiving data, a processor, logic unit, or central processing unit (CPU) 1230 to process the data, transmitter units (Tx) 1240 and egress ports 1250 for transmitting the data, and a memory 1260 for storing the data. The apparatus 1200 may also comprise optical-to-electrical (OE) components and electrical-to-optical (EO) components coupled to the ingress ports 1210, the receiver units 1220, the transmitter units 1240, and the egress ports 1250 for ingress or egress of optical or electrical signals.

The processor 1230 is implemented by any suitable combination of hardware, middleware, firmware, and software. The processor 1230 may be implemented as one or more CPU chips, cores (e.g. as a multi-core processor), field-programmable gate arrays (FPGAs), application specific integrated circuits (ASICs), or digital signal processors (DSPs). The processor 1230 is in communication with the ingress ports 1210, receiver units 1220, transmitter units 1240, egress ports 1250, and memory 1260. The processor 1230 comprises an E2E P2P path computation for E2E tunnel module 1270. The E2E P2P path computation for E2E tunnel module 1270 implements the disclosed embodiments. For instance, the inclusion of the E2E P2P path for E2E tunnel module 1270 provides a substantial improvement to the spectrum efficiency and systems complexity. The E2E P2P path for E2E tunnel module 1270 further improves the functionality of the apparatus 1200 and effects a transformation of the apparatus 1200 to a different state. Alternatively, the memory 1260 may store the shortest path computation module as instructions, and the processor 1230 executes those instructions. Further in the alternative, the apparatus 1200 comprises other means to implement the embodiments.

The memory 1260 comprises one or more disks, tape drives, or solid-state drives and may be used as an over-flow data storage device, to store programs when such programs are selected for execution, or to store instructions and data that are read during program execution. The memory 1260 may be volatile and/or non-volatile and may be read-only memory (ROM), random-access memory (RAM), ternary content-addressable memory (TCAM), or static random-access memory (SRAM).

Figure 13:
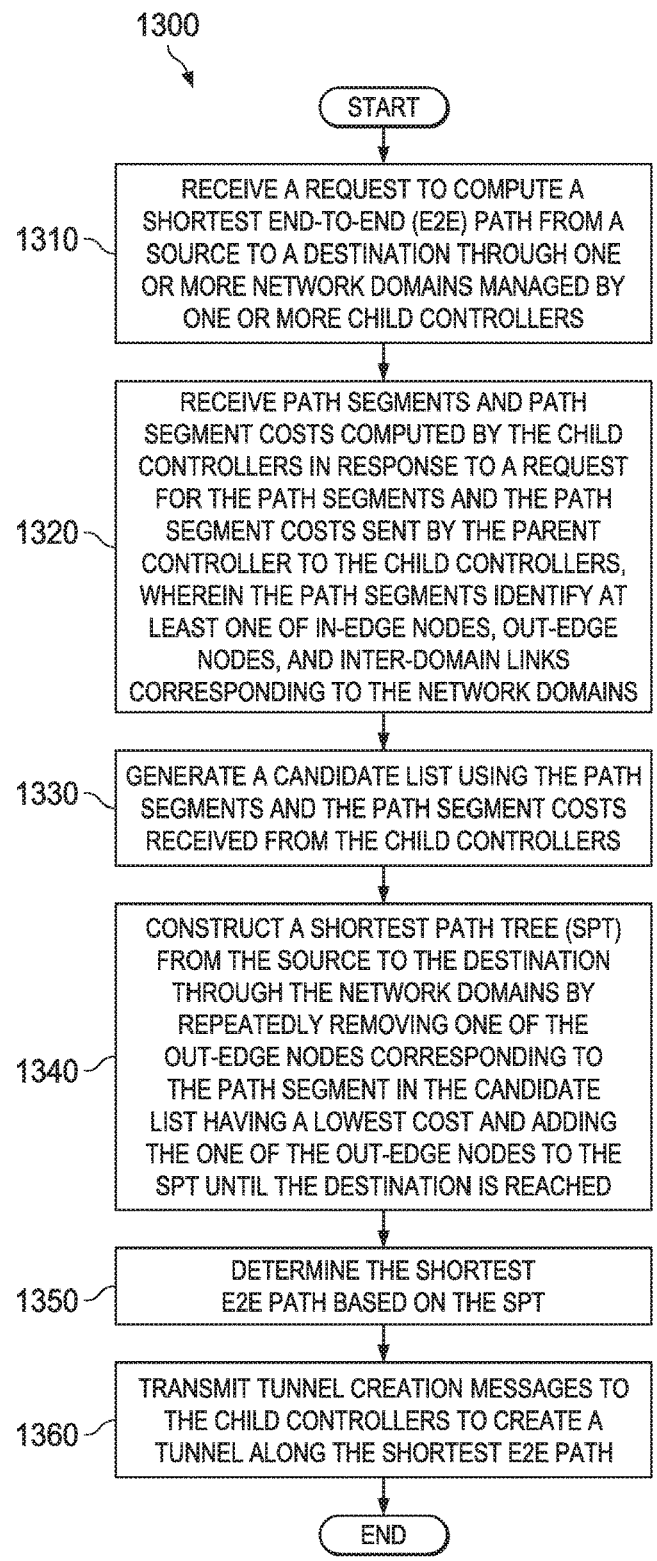
FIG. 13 is a flowchart of a method of creating an E2E tunnel along shortest E2E P2P path according to an embodiment of the disclosure.

FIG. 13 is a flowchart of a method 1300 of performing E2E tunnel creation based on the shortest E2E P2P path computation according to an embodiment of the disclosure. The method 1300 may be implemented by a network system such as the path computation system 100 and 200, or any suitable combinations of other devices implementing the path computation system 100 and 200. At step 1310, the parent controller receives a request to compute a shortest E2E path from a source to a destination through one or more network domains managed by one or more child controllers. At step 1320, the parent controller receives path segments and path segment costs computed by the child controllers in response to a request for the path segments and the path segment costs sent by the parent controller to the child controllers. In an embodiment, the path segments identify at least one of in-edge nodes, out-edge nodes, and inter-domain links corresponding to the network domains.

At step 1330, the parent controller generates a candidate list using the path segments and the path segment costs received from the child controllers. At step 1340, the parent controller constructs the SPT from the source to the destination through the network domains by repeatedly removing one of the out-edge nodes corresponding to the path segment in the candidate list having a lowest cost and adding the one of the out-edge nodes to the SPT until the destination is reached. Those skilled in the art will appreciate that the process of adding nodes to the SPT is more fully detailed above. For the sake of brevity, this process is not fully repeated here.

At step 1350, the parent controller determines the shortest E2E path based on the SPT. At step 1360, the parent controller transmits tunnel creation messages to the child controllers to create a tunnel along the shortest E2E path. Those skilled in the art will appreciate that the tunnel creation process is more fully detailed above. For the sake of brevity, this process is not fully repeated here.

A parent controller including means for receiving a request to compute a shortest end-to-end (E2E) path from a source to a destination through one or more network domains managed by one or more child controllers and for receiving path segments and path segment costs computed by the child controllers in response to a request for the path segments and the path segment costs sent by the parent controller to the child controllers, wherein the path segments identify at least one of in-edge nodes, out-edge nodes, and inter-domain links corresponding to the network domains; means for processing configured to generate a candidate list using the path segments and the path segment costs received from the child controllers, construct a shortest path tree (SPT) from the source to the destination through the network domains by repeatedly removing one of the out-edge nodes corresponding to the path segment in the candidate list having a lowest cost and adding the one of the out-edge nodes to the SPT until the destination is reached, and determine the shortest E2E path based on the SPT; and means for transmitting configured to transmit tunnel creation messages to the child controllers to create a tunnel along the shortest E2E path.

A network device configured to establish an end-to-end (E2E) tunnel corresponding to an E2E path. The network device includes means for transmitting configured to send a first message to a destination child controller managing a destination domain, wherein the first message includes a request to create a first segment of the E2E tunnel in the destination domain, and wherein the first message includes a first path identifier corresponding to a segment of the E2E path in the destination domain, identifies an initial node in the destination domain, and identifies a destination node in the destination domain; and means for receiving configured to receive a reply message from the destination child controller in response to the first message, wherein the reply message identifies a creation status of the first segment and includes a first incoming label, wherein the first incoming label was assigned by the destination child controller to a link between the initial node in the destination domain and a next hop node in the destination domain.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, units, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A parent controller comprising:
   a receiver configured to:
      receive a request to compute a shortest end-to-end (E2E) path from a source to a destination through one or more network domains managed by one or more child controllers; and
      receive path segments and path segment costs computed by the child controllers in response to a request for the path segments and the path segment costs sent by the parent controller to the child controllers, wherein the path segments identify at least one of in-edge nodes, out-edge nodes, and inter-domain links corresponding to the network domains;
   a processor coupled to the receiver and configured to:
      generate a candidate list using the path segments and the path segment costs received from the child controllers;
      construct a shortest path tree (SPT) from the source to the destination through the network domains by repeatedly removing one of the out-edge nodes corresponding to the path segment in the candidate list having a lowest cost and adding the one of the out-edge nodes to the SPT until the destination is reached; and
      determine the shortest E2E path based on the SPT; and
   a transmitter coupled to the processor and configured to transmit tunnel creation messages to the child controllers to create a tunnel along the shortest E2E path.

2. The parent controller of claim 1, wherein the processor is further configured to allocate a global tunnel identifier (ID) and a path ID for each network domain for creating the tunnel along the shortest E2E path.

3. The parent controller of claim 2, wherein the tunnel creation messages further comprise the global tunnel ID and the path ID.

4. The parent controller of claim 1, wherein the path segments comprise links corresponding to the path segments.

5. The parent controller of claim 1, wherein the tunnel creation messages further comprise an outgoing label and a link used to create tunnel segments between the source and the destination.

6. The parent controller of claim 1, wherein the processor determines whether each node in one of the network domains is a destination node, a source node, one of the in-edge nodes, one of the out-edge nodes, or in a destination domain.

7. The parent controller of claim 1, wherein the transmitter is configured to transmit an except list to the child controllers, wherein the except list identifies nodes to which no path segments are computed.

8. The parent controller of claim 1, wherein the SPT is grown until the SPT includes the source and the destination.

9. A network device configured to establish an end-to-end (E2E) tunnel corresponding to an E2E path, comprising:
   a transmitter configured to send a first message to a destination child controller managing a destination domain, wherein the first message includes a request to create a first segment of the E2E tunnel in the destination domain, and wherein the first message includes a first path identifier corresponding to a segment of the E2E path in the destination domain, identifies an initial node in the destination domain, and identifies a destination node in the destination domain; and a receiver operably coupled to the transmitter and configured to receive a reply message from the destination child controller in response to the first message, wherein the reply message identifies a creation status of the first segment and includes a first incoming label, wherein the first incoming label was assigned by the destination child controller to a link between the initial node in the destination domain and a next hop node in the destination domain.

10. The network device of claim 9, wherein the reply message is received after the destination child controller has at least one of reserved resources for the first segment within the destination domain, allocated a label to each link within the first segment, and written cross connects on each node within the first segment.

11. The network device of claim 9, wherein the transmitter is configured to send a second message to an upstream child controller managing an upstream domain, wherein the second message includes a request to create a second segment of the E2E tunnel in the upstream domain.

12. The network device of claim 11, wherein the second message includes a second path identifier corresponding to a segment of the E2E path in the upstream domain, identifies an initial node in the upstream domain, and identifies a final node in the upstream domain.

13. The network device of claim 12, wherein the final node in the upstream domain and the initial node in the destination domain are a same node.

14. The network device of claim 12, wherein the receiver is configured to receive a reply message from the upstream child controller in response to the second message, wherein the reply message identifies a creation status of the second segment and includes a second incoming label, wherein the second incoming label was assigned by the upstream child controller to an inter-domain link between an out-edge node in a domain further upstream of the upstream domain and the initial node in the upstream domain.

15. The network device of claim 14, wherein the reply message is received after the upstream child controller has at least one of reserved resources for the second segment within the upstream domain, allocated a label to each link within the second segment, and written cross connects on each node within the second segment.

16. The network device of claim 15, wherein the transmitter is configured to send a third message to a source child controller managing a source domain, wherein the second message includes a request to create a third segment of the E2E tunnel in the source domain, wherein the third message includes a third path identifier corresponding to a segment of the E2E path in the source domain, identifies a source node in the source domain, and identifies a final node in the source domain.

17. The network device of claim 16, wherein the receiver is configured to receive a reply message from the source child controller in response to the third message, wherein the reply message indicates that the E2E tunnel was successfully established.

18. A method implemented in a parent controller, comprising:

receiving a request to compute a shortest end-to-end (E2E) path from a source to a destination through one or more network domains managed by one or more child controllers;

receiving path segments and path segment costs computed by the child controllers in response to a request for the path segments and the path segment costs sent by the parent controller to the child controllers, wherein the path segments identify at least one of in-edge nodes, out-edge nodes, and inter-domain links corresponding to the network domains;

generating a candidate list using the path segments and the path segment costs received from the child controllers;

constructing a shortest path tree (SPT) from the source to the destination through the network domains by repeatedly removing one of the out-edge nodes corresponding to the path segment in the candidate list having a lowest cost and adding the one of the out-edge nodes to the SPT until the destination is reached;

determining the shortest E2E path based on the SPT; and transmitting tunnel creation messages to the child controllers to create a tunnel along the shortest E2E path.

19. The method of claim 18, further comprising allocating a global tunnel identifier (ID) and a path ID for each network domain for creating the tunnel along the shortest E2E path.

20. The method of claim 19, further comprising transmitting an except list to the child controllers, wherein the except list identifies nodes to which no path segments are computed.

* * * * *